(12) United States Patent
Hosek et al.

(10) Patent No.: US 12,269,160 B2
(45) Date of Patent: Apr. 8, 2025

(54) MATERIAL-HANDLING ROBOT WITH MAGNETICALLY GUIDED END-EFFECTORS

(71) Applicant: Persimmon Technologies Corporation, Wakefield, MA (US)

(72) Inventors: Martin Hosek, Salem, NH (US); Dennis Poole, East Derry, NH (US)

(73) Assignee: Persimmon Technologies Corporation, Wakefield, MA (US)

( * ) Notice: Subject to any disclaimer, the term of this patent is extended or adjusted under 35 U.S.C. 154(b) by 532 days.

(21) Appl. No.: 17/463,694

(22) Filed: Sep. 1, 2021

(65) Prior Publication Data

US 2022/0063114 A1 Mar. 3, 2022

Related U.S. Application Data

(60) Provisional application No. 63/073,152, filed on Sep. 1, 2020, provisional application No. 63/148,657, filed on Feb. 12, 2021.

(51) Int. Cl.
*B25J 19/02* (2006.01)
*B25J 11/00* (2006.01)

(52) U.S. Cl.
CPC ......... *B25J 19/027* (2013.01); *B25J 11/0095* (2013.01); *B25J 19/021* (2013.01)

(58) Field of Classification Search
CPC ............................ B25J 11/0095; B25J 19/021
See application file for complete search history.

(56) References Cited

U.S. PATENT DOCUMENTS

| 5,151,008 A * | 9/1992 | Ishida | B25J 9/0084 |
| | | | 414/744.5 |
| 9,149,936 B2 | 10/2015 | Hosek et al. | |
| 10,224,232 B2 | 3/2019 | Hosek | |
| 10,269,604 B2 | 4/2019 | Hofmeister et al. | |
| 10,363,665 B2 | 7/2019 | Hosek et al. | |
| 10,538,000 B2 | 1/2020 | Hosek et al. | |
| 10,543,596 B2 | 1/2020 | Hosek et al. | |
| 10,580,682 B2 | 3/2020 | Hosek et al. | |
| 10,596,710 B2 | 3/2020 | Hosek et al. | |

(Continued)

FOREIGN PATENT DOCUMENTS

KR 20120131530 A 12/2012
WO WO-2020116510 A1 9/2021

*Primary Examiner* — Khoi H Tran
*Assistant Examiner* — Tristan J Greiner
(74) *Attorney, Agent, or Firm* — McCarter & English, LLP

(57) ABSTRACT

An apparatus includes a drive unit; and an arm assembly connected to the drive unit, where the arm assembly comprises a traversing platform having an end-effector configured to carry a payload located thereon; a linear actuation system configured to drive the traversing platform in a linear direction; and a magnetic support system comprising at least one guide attached to a frame of the arm assembly, a plurality of vertical actuators attached to the traversing platform, and a plurality of horizontal actuators attached to the traversing platform, the plurality of vertical actuators being configured, with the at least one guide, to move the traversing platform in a vertical direction relative to the linear direction, and the plurality of horizontal actuators being configured, with the at least one guide, to move the traversing platform in a horizontal direction relative to the linear direction.

18 Claims, 17 Drawing Sheets

(56) References Cited

U.S. PATENT DOCUMENTS

| | | |
|---|---|---|
| 10,742,070 B2 | 8/2020 | Hosek et al. |
| 2008/0024749 A1* | 1/2008 | Williams .............. H02K 41/03 |
| | | 355/75 |
| 2015/0013910 A1* | 1/2015 | Krupyshev ....... H01L 21/67184 |
| | | 118/500 |
| 2015/0214086 A1* | 7/2015 | Hofmeister ............ H02J 50/90 |
| | | 414/744.5 |
| 2016/0167229 A1* | 6/2016 | Hosek ...................... B25J 18/04 |
| | | 74/490.06 |
| 2020/0262060 A1 | 8/2020 | Hosek et al. |

* cited by examiner

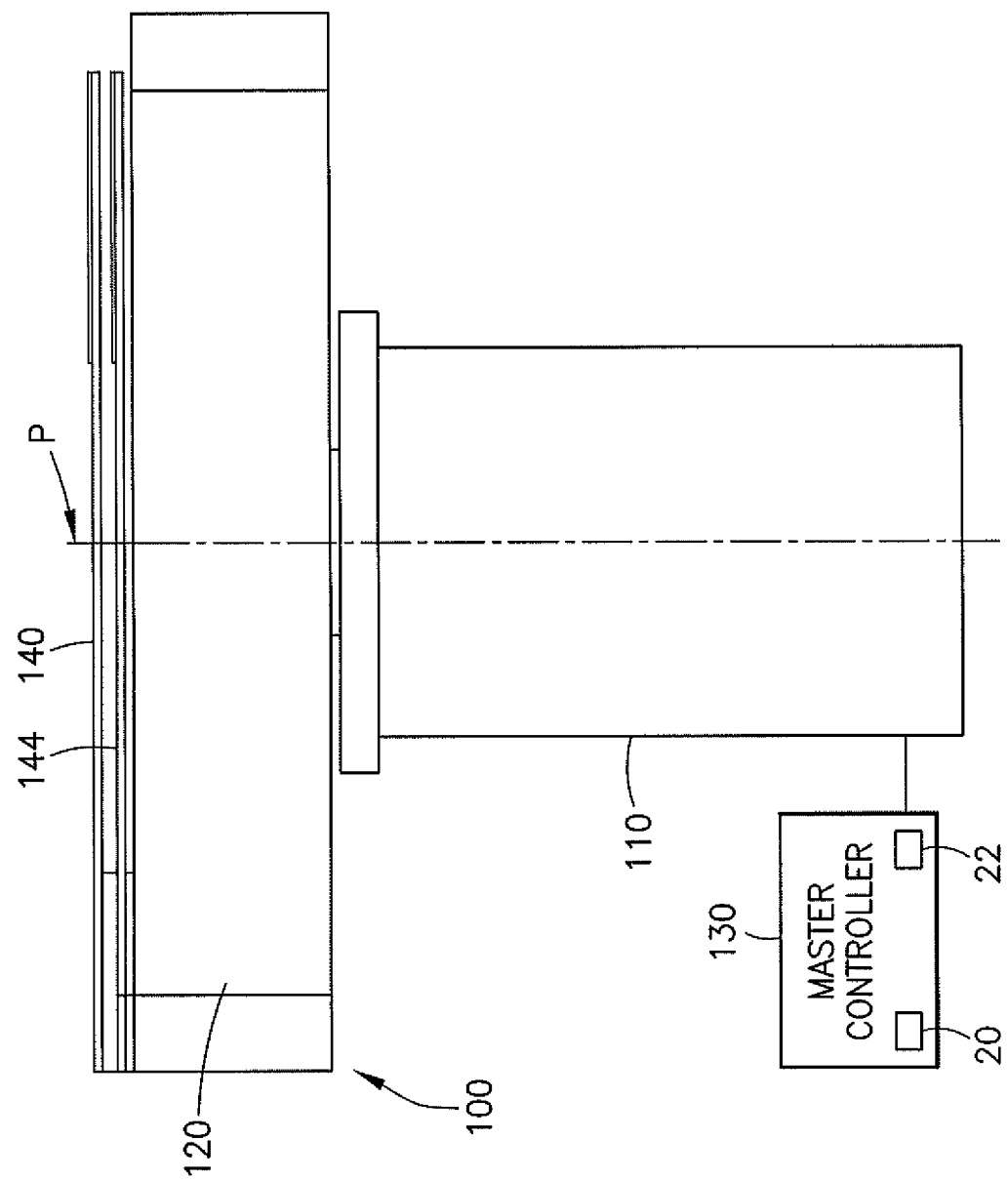

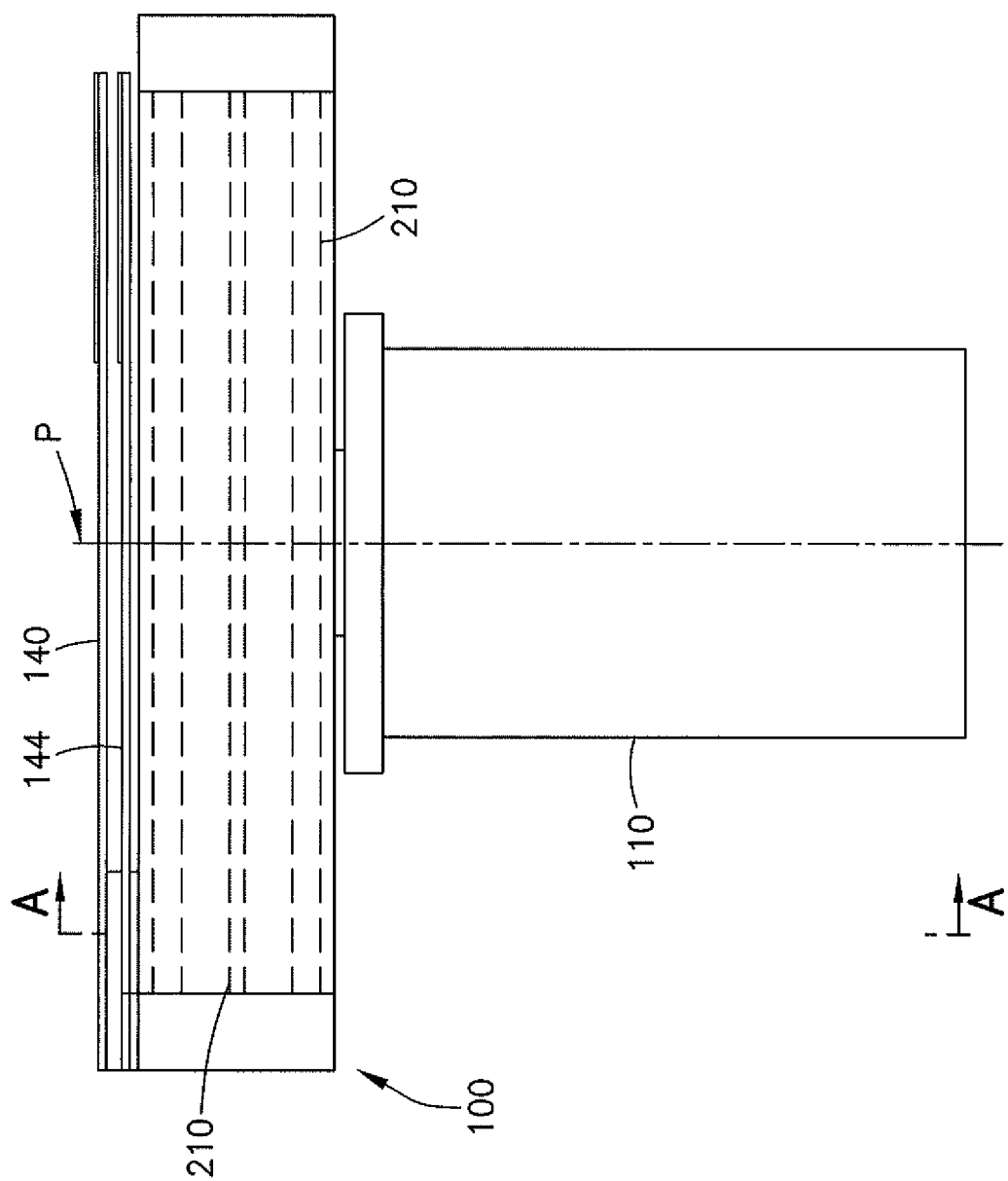

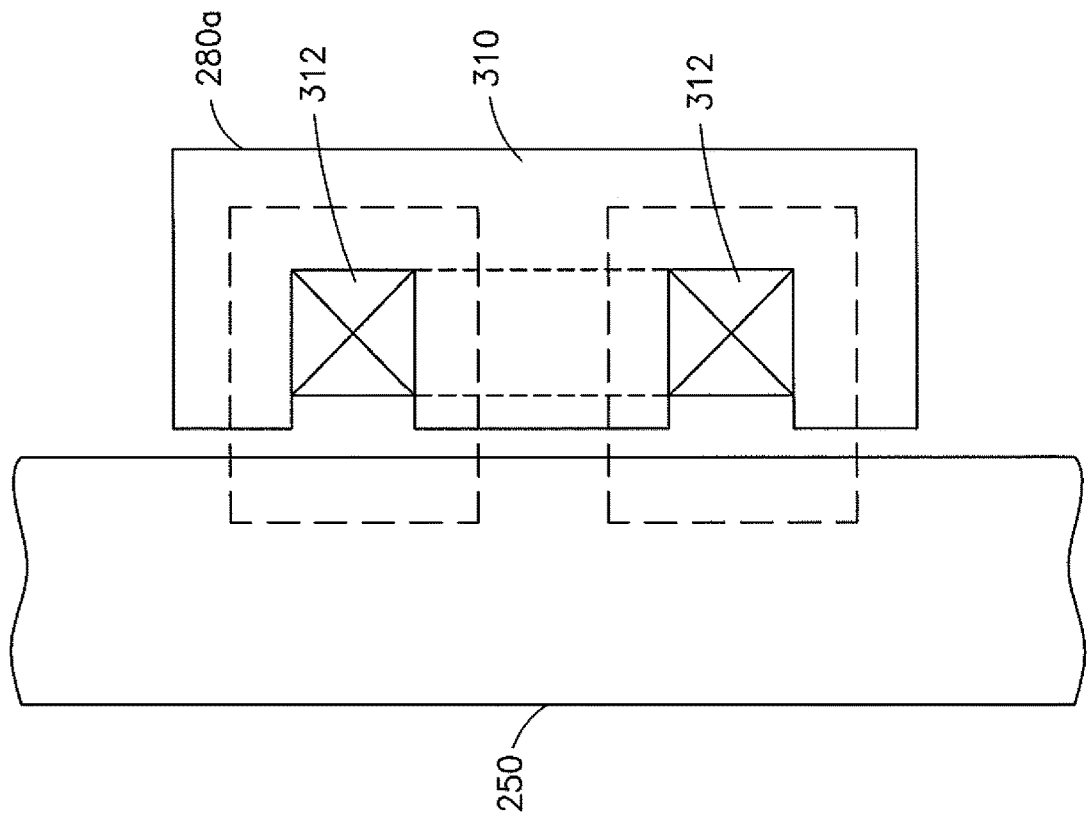
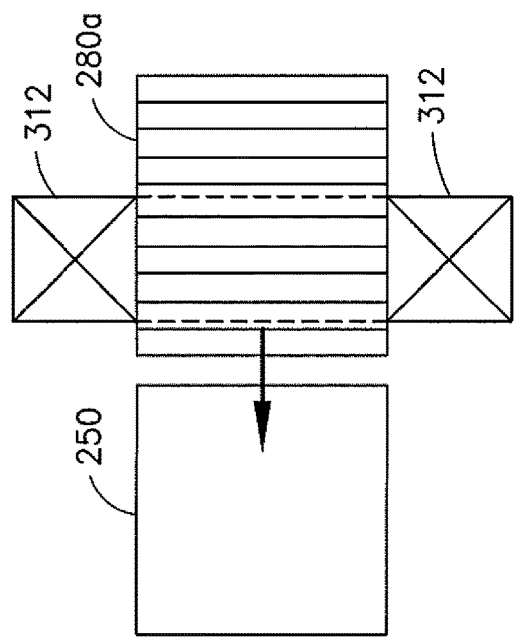
FIG.3B
FIG.3A

MATERIAL-HANDLING ROBOT WITH MAGNETICALLY GUIDED END-EFFECTORS

CROSS REFERENCE TO RELATED APPLICATIONS

This application claims priority under 35 USC 119(e) to U.S. Provisional Application No. 63/073,152, filed Sep. 1, 2020, and U.S. Provisional Application No. 63/148,657, filed Feb. 12, 2021, the contents of which are hereby incorporated by reference in their entireties.

BACKGROUND

Technical Field

The example and non-limiting embodiments relate generally to a material-handling robot and, more particularly, to a material-handling robot for manipulating and transferring payload, such as semiconductor wafers in semiconductor processing systems for example, using one or more magnetically guided end-effectors.

SUMMARY

In accordance with one aspect, an apparatus comprises a drive unit; and an arm assembly connected to the drive unit, where the arm assembly comprises a traversing platform having an end-effector configured to carry a payload located thereon; a linear actuation system configured to drive the traversing platform in a linear direction; and a magnetic support system comprising at least one guide attached to a frame of the arm assembly, a plurality of vertical actuators attached to the traversing platform, and a plurality of horizontal actuators attached to the traversing platform, the plurality of vertical actuators being configured, with the at least one guide, to move the traversing platform in a vertical direction relative to the linear direction, and the plurality of horizontal actuators being configured, with the at least one guide, to move the traversing platform in a horizontal direction relative to the linear direction.

In accordance with another aspect, an apparatus comprises at least one processor; and at least one non-transitory memory including computer program code, the at least one memory and the computer program code configured to, with the at least one processor, cause the apparatus at least to: actuate three vertical actuators to control first, second, and third degrees of freedom related to a vertical position of a traversing platform of a robot; actuate three horizontal actuators to control fourth and fifth degrees of freedom related to a horizontal position of the traversing platform of the robot; and actuate a linear actuator to control a sixth degree of freedom related to a linear movement of the traversing platform of the robot.

In another aspect, a method of adjusting a position of a traversing platform of a robot comprises actuating three vertical actuators to control first, second, and third degrees of freedom related to a vertical position of the traversing platform; actuating three horizontal actuators to control fourth and fifth degrees of freedom related to a horizontal position of the traversing platform; and actuating a linear actuator to control a sixth degree of freedom related to a linear movement of the traversing platform.

In another aspect, an apparatus comprises a drive unit; and an arm assembly connected to the drive unit. The arm assembly comprises a first traversing platform having a first end-effector configured to carry a first payload located thereon, a first linear actuation system configured to drive the first traversing platform in a first direction, and a first magnetic support system comprising at least one first guide attached to a frame of the arm assembly, a first plurality of vertical actuators attached to the first traversing platform, and a first plurality of horizontal actuators attached to the first traversing platform, the first plurality of vertical actuators being configured, with the at least one first guide, to move the first traversing platform in a vertical direction, and the first plurality of horizontal actuators being configured, with the at least one first guide, to move the first traversing platform in a horizontal direction; and at least one second traversing platform having a second end-effector configured to carry a second payload located thereon, a second linear actuation system configured to drive the second traversing platform in a first direction, and a second magnetic support system comprising at least one second guide attached to the frame of the arm assembly, a second plurality of vertical actuators attached to the second traversing platform, and a second plurality of horizontal actuators attached to the second traversing platform, the second plurality of vertical actuators being configured, with the at least one second guide, to move the second traversing platform in a vertical direction, and the second plurality of horizontal actuators being configured, with the at least one second guide, to move the second traversing platform in a horizontal direction.

BRIEF DESCRIPTION OF THE DRAWINGS

The foregoing aspects and other features are explained in the following description, taken in connection with the accompanying drawings, wherein:

FIGS. 2A, 2B, and 2C are schematic representations of views of internal components of a robot arm of the robot;

FIGS. 3A and 3B are schematic representations of top and side views, respectively, of a unidirectional actuator of the robot;

FIGS. 7A, 7B, 8, 9, and 10 are graphical representations of movements of traversing platforms and end-effectors of the robot.

DETAILED DESCRIPTION OF EMBODIMENT

Figure 1C:
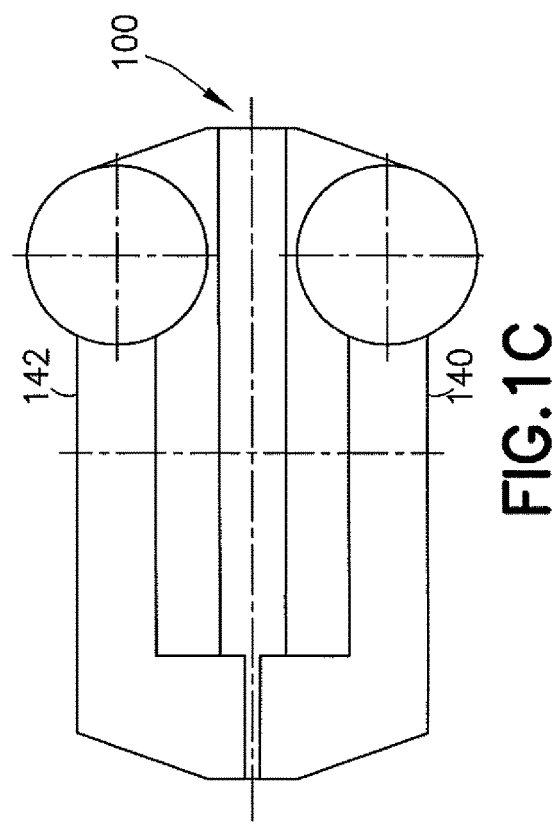
FIGS. 1A, 1B, and 10 are schematic representations of views of one example of a robot.

Although the features will be described with reference to the example embodiments shown in the drawings, it should be understood that features can be embodied in many alternate forms of embodiments. In addition, any suitable size, shape, or type of elements or materials could be used.

Figure 1B:
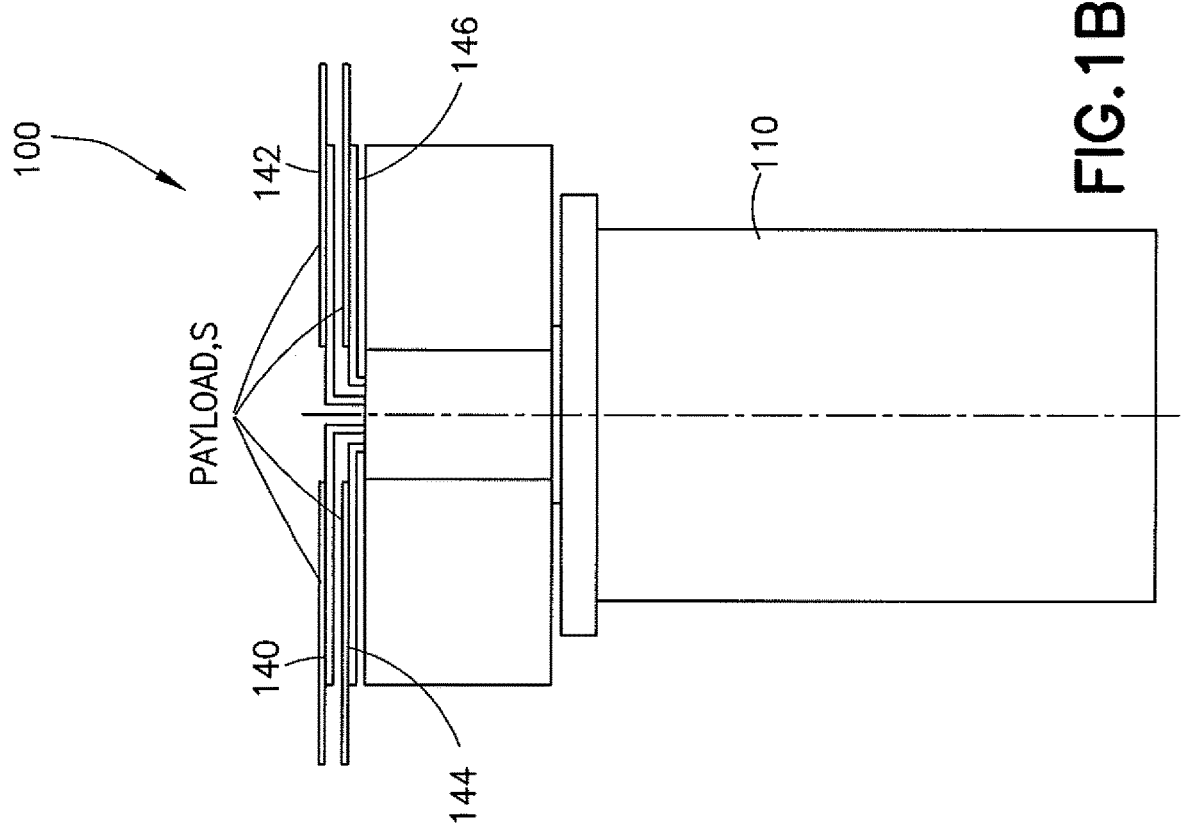

Referring to FIGS. 1A-1C, one example embodiment of a robot is depicted diagrammatically at 100. Robot 100 may comprise a drive unit 110, an arm assembly comprising at least one robot arm 120, and a master control system 130 comprising a processor 20 and a memory 22. In FIGS. 1A-1C, the robot 100 is shown with end-effectors in retracted positions. The following U.S. patents, which are all hereby incorporated by reference in their entireties, disclose various robot arms and substrate processing and transport apparatuses: U.S. Pat. Nos. 9,149,936; 10,224,232; 10,363,665; 10,538,000; 10,543,596; 10,580,682; 10,596,710; 10,742,070; 10,269,604 and US patent publication No. 2020/0262060 A1.

In the particular example of FIGS. 1A-1C, the robot 100 includes four end-effectors, each configured to carry a payload S. Referring to FIG. 1B, the end-effectors include an upper pair of end-effectors, for example, left upper end-effector 140 and right upper end-effector 142, which are arranged in a side-by-side manner. The end-effectors further include a lower pair of end-effectors, for example, left lower end-effector 144 and right lower end-effector 146, which are also arranged in a side-by-side manner. The two pairs of end-effectors, for example, the upper pair and lower pair, are arranged in a stacked configuration.

The drive unit 110 of the robot 100 may include a spindle assembly configured to rotate the robot arm 120 or various portions of the robot arm 120 around a pivot point P. The spindle assembly may comprise a spindle housing, one or more motors and one or more drive shafts. If so desired, the drive unit 110 may further include a vertical lift mechanism, for example, comprising one or more linear rail-bearing arrangements and a motor-driven ball-screw, configured to lift the spindle assembly up or down in the vertical direction.

Considering that the robot arm 100 may operate in a vacuum environment, the spindle assembly of the drive unit 110 may include sealing and other features that may allow the drive shaft(s) or upper portions of the drive shaft(s) to be in a vacuum environment. As an example, a substantially cylindrical separation barrier between the rotor(s) of the motor(s) and the stator(s) of the motor(s) may be utilized to contain an external atmospheric environment on the stator side (outer side) of the separation barrier and a vacuum environment on the rotor side (inner side) of the separation barrier, in which case the drive shaft(s) may reside in a vacuum environment in their entirety. As another example, rotary seal(s), such as ferrofluidic seal(s), may be utilized to allow upper portions of the drive shafts to protrude from an atmospheric environment to a vacuum environment.

Figure 2C:
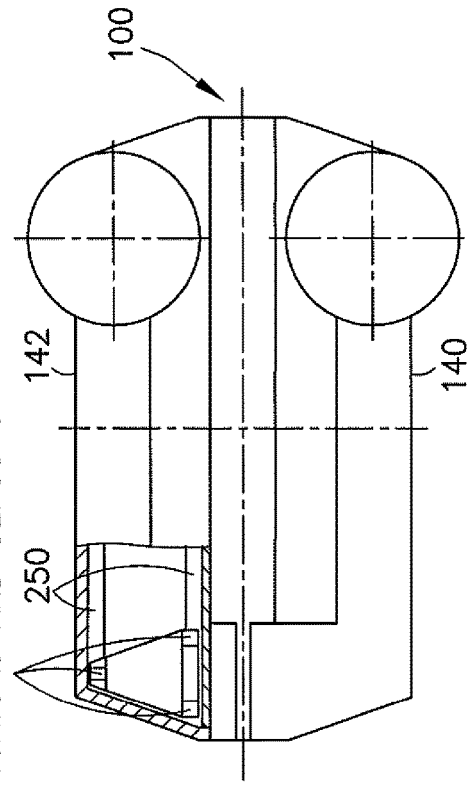
Figure 2B:
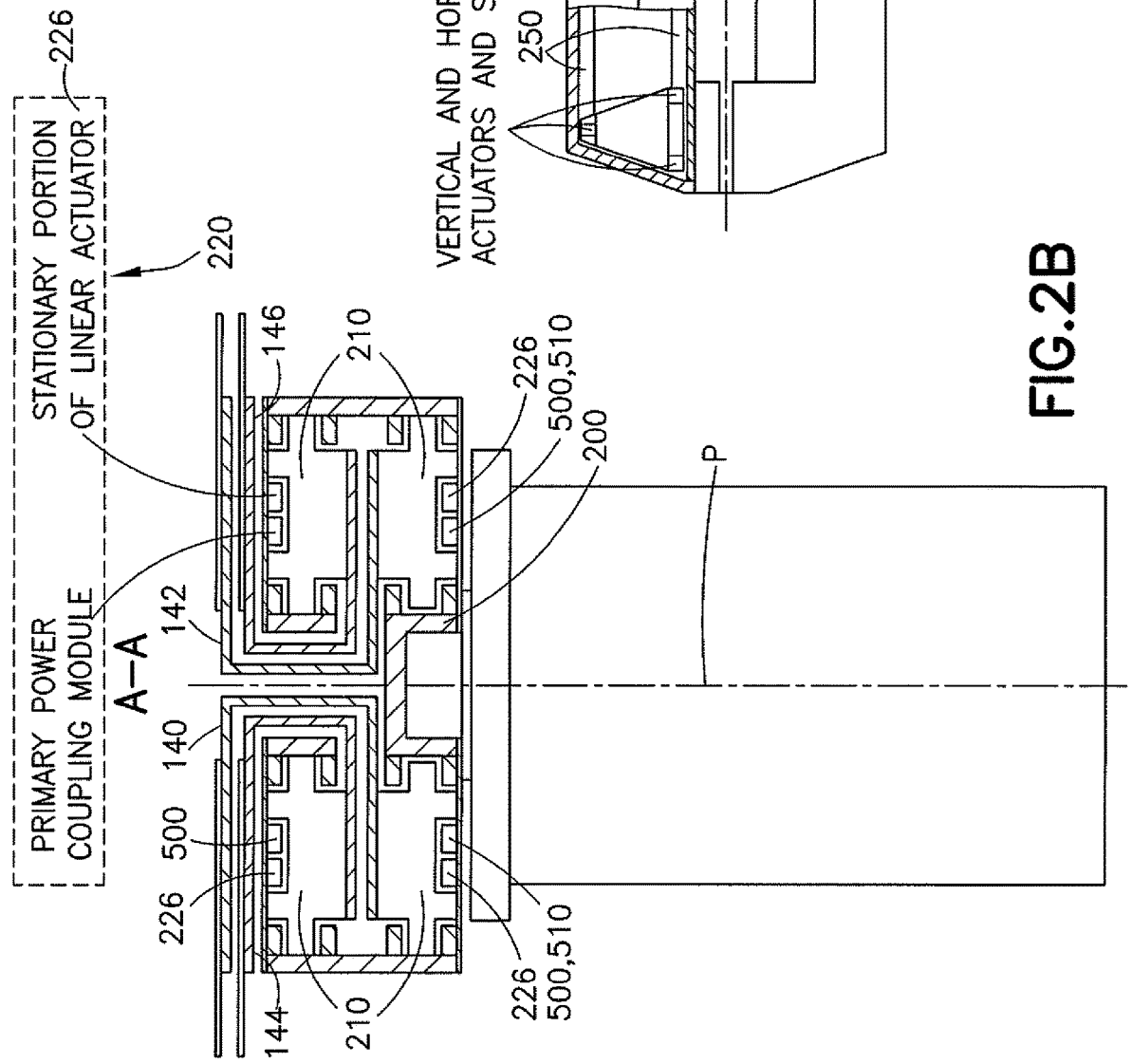

Referring to FIGS. 2A-2C, the robot arm 120 may comprise a frame 200, one or more traversing platforms 210, and the one or more end-effectors 140, 142, 144, 146, each attached to a respective traversing platform 210. As illustrated in FIGS. 2A-2C, which provide a simplified partial cross-sectional view of an example internal arrangement of the robot arm 120 of FIGS. 1A-1C, each of the traversing platforms 210 may be driven by a linear actuation system 220 and guided by a magnetic support system 248. In FIG. 2B, cross-section A-A, internal components of linear actuation system 220 and the traversing platforms 210 are not shown for clarity of depiction.

Figure 2D:
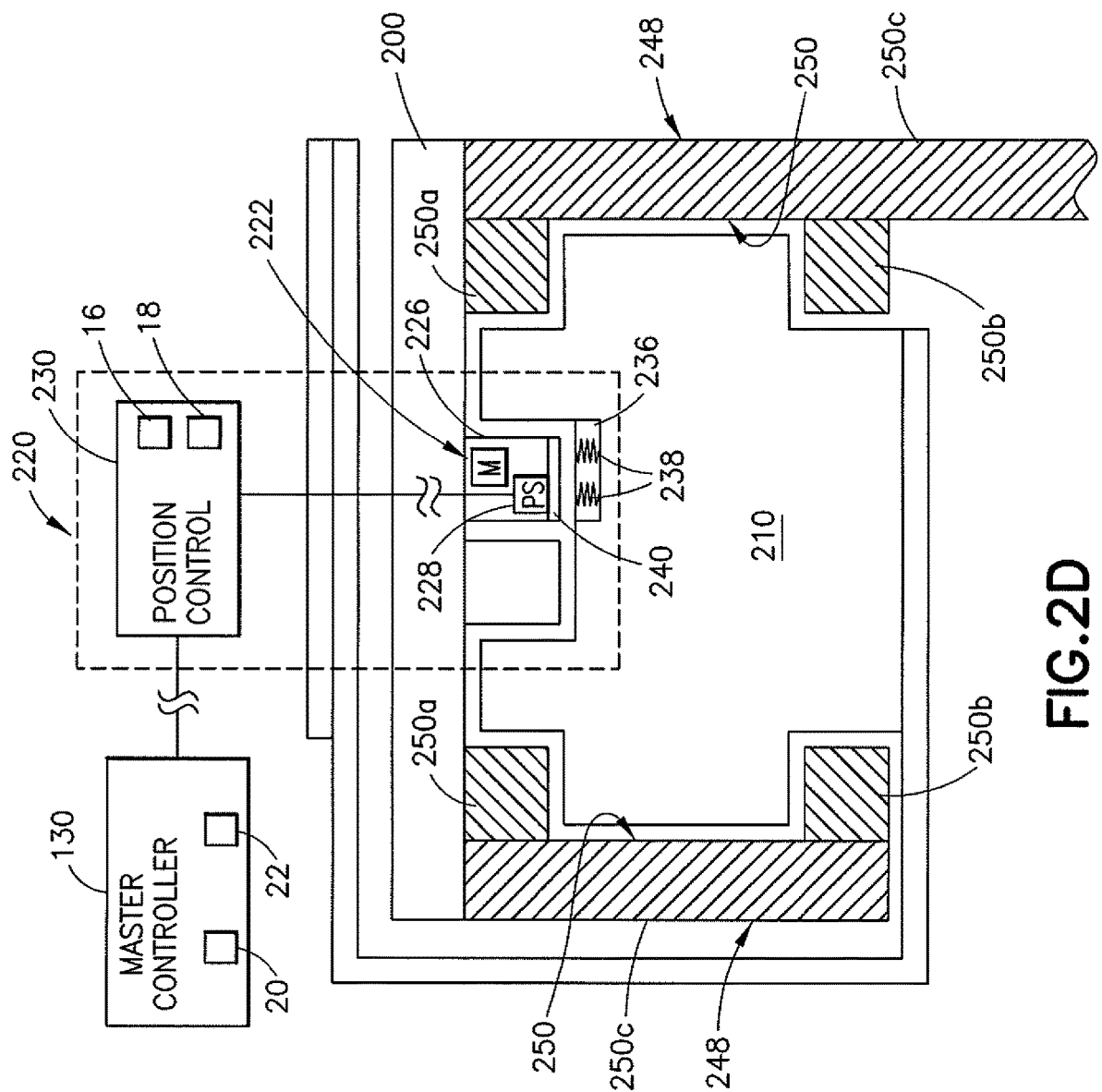
FIG. 2D is a schematic representation of a traversing platform and a linear actuation system inside a frame of the robot.

Referring now to FIG. 2D, the linear actuation system 220 may comprise at least one linear actuator 222, at least one position sensor (PS) 228, and at least one position control system 230 having a processor 16 and a memory 18. The position control system 230 may be incorporated into the master control system 130.

The linear actuator 222 may comprise a movable portion 236, which may be connected to the traversing platform 210, and a stationary portion 226, which may be attached to the frame 200 of the robot arm 120. For example, the linear actuator 222 may include a linear motor (M), such as a permanent magnet linear motor. In this example, the movable portion 236 may be a forcer with coils 238, and the stationary portion 226 may be a magnet track 240. The linear actuator 222 may be configured to produce a force between the movable portion 236 and the stationary portion 226 (for example, via the forcer and coils 238) substantially in the direction of the desired traversing motion of the traversing platform 210 (for example, along the magnet track 240).

The position sensor 228 of the linear actuation system 220 may be configured to measure the position of the traversing platform 210 along the desired direction of traversing motion. As an example, the position sensor 228 may be a position encoder, such as an optical, magnetic, inductive, or capacitive position encoder, a laser interferometer, or any other suitable device capable of measuring the position of the traversing platform 210 along the desired direction of traversing motion.

Utilizing the measurements from the position sensor 228, the force produced by the linear actuator 222 may be used to control the position of the traversing platform 210 along the direction of its desired traversing motion.

The magnetic support system 248 may be configured to support and guide the traversing platform 210 along the direction of its desired traversing motion. The magnetic support system 248 may comprise one or more stationary guides 250 attached to the frame 200 of the robot arm 120 and arranged to be substantially parallel with the desired traversing motion of the traversing platform 210.

In the example embodiment shown in FIG. 2D, the stationary guides 250 may be two substantially parallel guides, each featuring a C-shaped cross-section. Each C-shaped portion may be defined by two parallel soft magnetic sections 250a, 250b attached to a non-magnetic vertical structure 250c.

Figure 2E:
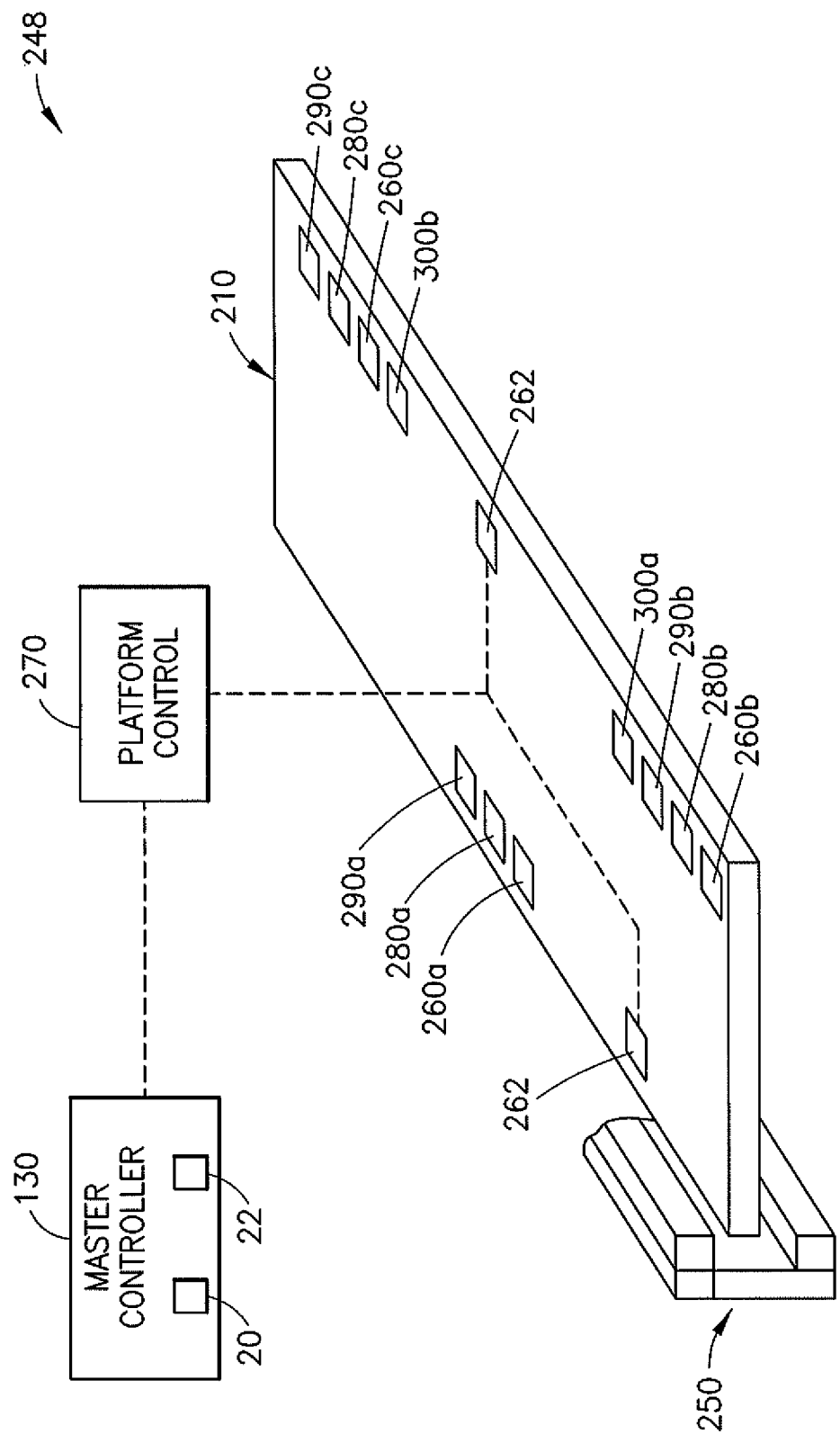
FIG. 2E is a schematic representation of a traversing platform and actuators and sensors located on the traversing platform.

As shown in FIG. 2E, the magnetic support system 248 may also comprise a plurality of bidirectional electromagnetic actuators 260a, 260b, 260c attached to the traversing platform 210 and configured to produce forces between the traversing platform 210 and the stationary guides 250 (only one of which is partially shown in FIG. 2E). The magnetic support system 248 may further include sensors 262 that may determine the position of the traversing platform 210 with respect to the stationary guides 250 and a platform control system 270 that may control the position of the traversing platform 210 with respect to the stationary guides 250. The platform control system 270 of the magnetic support system 248 may be incorporated into the master control system 130. In FIG. 2E, the traversing platform 210 is shown as having flat upper and lower surfaces for clarity in depicting the components located thereon.

Still referring to FIG. 2E, a first of the bidirectional electromagnetic actuators 260a may be attached to the traversing platform 210 on or proximate a side surface of the traversing platform 210, such as on one side of the traversing platform 210, so that bidirectional vertical force can be produced between the traversing platform 210 and the corresponding stationary guide 250 in the direction normal to the surface of the stationary guide 250. A second bidirectional electromagnetic actuator 260b may be attached close to the front of the traversing platform 210 on the other side so that bidirectional vertical force can be produced between the traversing platform 210 and the other stationary guide 250 in the direction normal to the surface of the stationary guide 250. A third bidirectional electromagnetic actuator 260c may be attached close to the rear of the traversing platform 210 on the same side as the second bidirectional actuator 260b so that bidirectional vertical force can be produced between the traversing platform 210 and the stationary guide 250 in the direction normal to the surface of the stationary guide 250. The above three bidirectional electromagnetic actuators 260a, 260b, 260c are herein referred to as vertical actuators of the magnetic support system 248.

Also as shown in FIG. 2E, the magnetic support system 248 may also comprise a plurality of unidirectional electromagnetic actuators 280a, 280b, 280c attached to the traversing platform and configured to produce forces between the traversing platform 210 and the stationary guides 250. A first unidirectional electromagnetic actuator 280a may be attached to the traversing platform 210 close to the first vertical actuator 260a so that the first unidirectional electromagnetic actuator 280a can produce unidirectional horizontal force between the traversing platform 210 and the corresponding stationary guide 250 in the direction normal to the surface of the stationary guide 250. A second unidirectional electromagnetic actuator 280b may be attached to the traversing platform 210 close to the second vertical actuator 260b so that the second unidirectional electromagnetic actuator 280b can produce unidirectional horizontal force between the traversing platform 210 and the other stationary guide 250 in the direction normal to the surface of the stationary guide 250. A third unidirectional electromagnetic actuator 280c may be attached to the traversing platform 210 close to the third vertical actuator 260c so that the third vertical actuator 260c can produce unidirectional horizontal force between the traversing platform 210 and the stationary guide 250 in the direction normal to the surface of the stationary guide 250. The above three unidirectional actuators 280a, 280b, 280c are referred to as horizontal actuators of the magnetic support system 248.

A first vertical sensor 290a configured to measure the position of the traversing platform 210 with respect to one of the stationary guides 250 in the vertical direction may be located at or near the location of the first vertical actuator 260a. Similarly, a second vertical sensor 290b that that can measure the position of the traversing platform 210 with respect to the other stationary guide 250 in the vertical direction may be located at or near the location of the second vertical actuator 260b, and a third vertical sensor 290c that can measure the position of the traversing platform 210 with respect to the same stationary guide 250 in the vertical direction may be located at or near the location of the third vertical actuator 260c.

A first horizontal sensor 300a configured to measure the position of the traversing platform 210 with respect to one of the stationary guides 250 in the horizontal direction may be located at or near the location of the second horizontal actuator 280b. Similarly, a second horizontal sensor 300b that can measure the position of the traversing platform 210 with respect to the other stationary guide 250 in the horizontal direction may be located at or near the location of the third horizontal actuator 280c.

As an example, the above sensors, which can measure the position of the traversing platform 210 with respect to the stationary guides 250 in the vertical and horizontal directions, may be gap sensors, such as optical, magnetic, inductive, or capacitive gap sensors.

The traversing platform 210 can be viewed as a single rigid body in space which, as such, possesses six degrees of freedom. The six degrees of freedom may be represented, for example, by three Cartesian coordinates of a reference point on the traversing platform 210 (for example, x, y, and z coordinates) and three angular coordinates (for example, representing rotations around the x, y, and z axes). Conveniently, the angle representing rotation around the x-axis may be referred to as the roll angle, the angle representing rotation around the y-axis may be referred to as the pitch angle, and the angle representing rotation around the z-axis may be referred to as the yaw angle of the traversing platform 210.

Based on the measurements from the sensors, the three bidirectional vertical actuators 260a, 260b, 260c can be utilized to control three degrees of freedom of the traversing platform 210, namely the vertical position represented by the z-axis coordinate, the pitch angle, and the roll angle of the traversing platform 210. The three unidirectional horizontal actuators 280a, 280b, 280c can be used to control additional two degrees of freedom of the traversing platform 210, namely the lateral position represented by the y-axis coordinate and the yaw angle of the traversing platform 210. The linear actuator 222 may be employed to control the remaining degree of freedom, namely the position of the traversing platform 210 along the desired direction of traversing motion represented by the x-axis coordinate.

Referring to FIGS. 3A and 3B, an example of a unidirectional electromagnetic actuator that may be utilized as a horizontal actuator in the magnetic support system is diagrammatically depicted. Although unidirectional horizontal actuator 280a is shown, other unidirectional horizontal actuators (for example, 280b and 280c) are similar. The unidirectional horizontal actuator 280a may comprise an E-shaped iron core 310 and a winding 312 installed on the iron core 310 and configured to produce magnetic flux through the iron core 310, which in turn may produce attractive force between the iron core 310 and the stationary guide 250 of the magnetic support system. As shown, paths of the magnetic flux are illustrated by dotted lines; the arrow indicates the force produced by and acting on the actuator 280a.

Figure 4A:
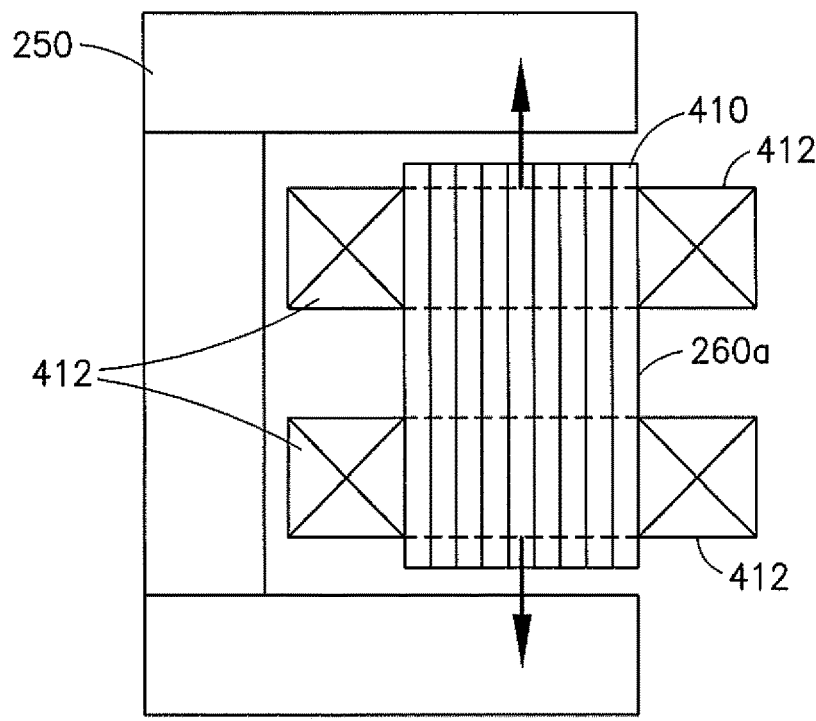
FIGS. 4A and 4B are schematic representations of top and side views, respectively, of a bidirectional actuator of the robot.
Figure 4B:
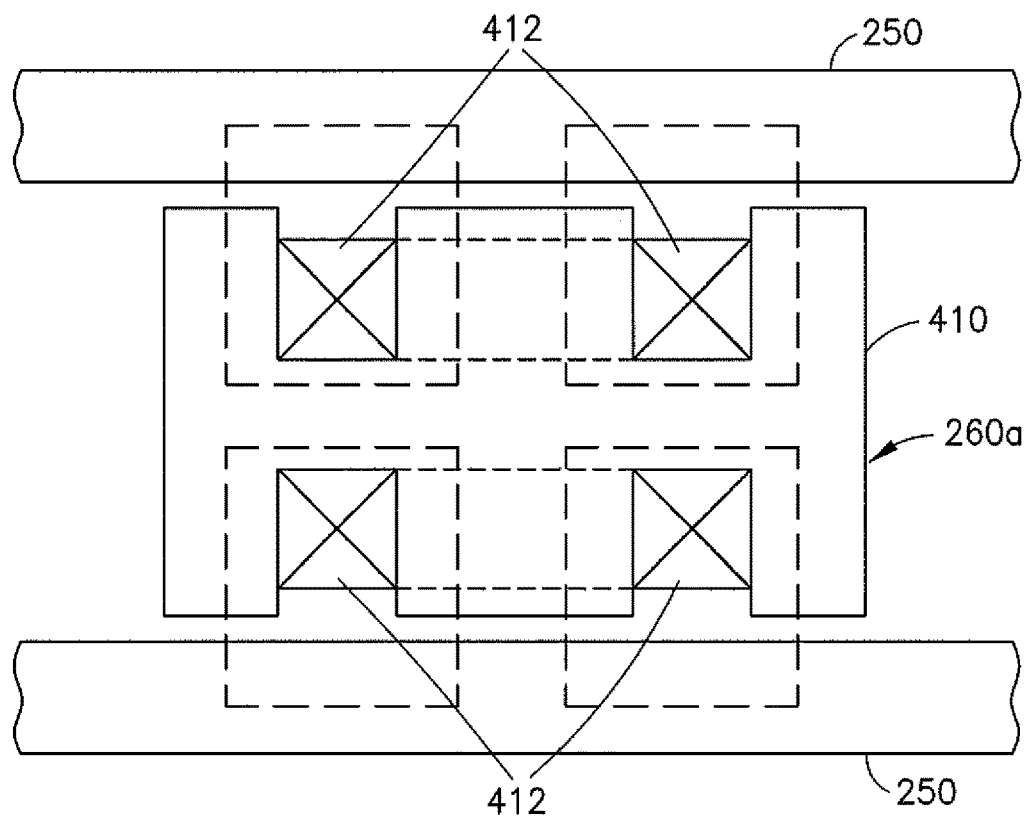
Figure 5A:
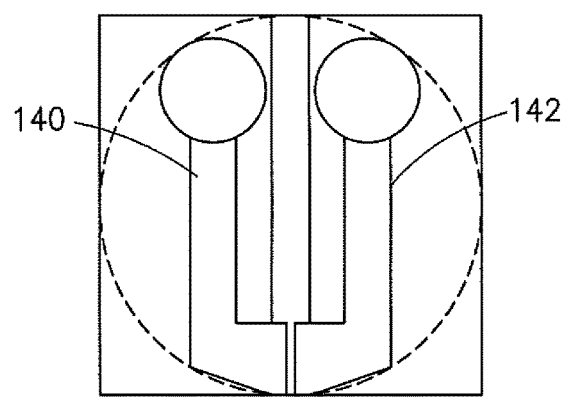
FIGS. 5(a), 5(b), 5(c), 5(d), 5(e), 5(f), 5(g), and 5(h) are schematic representations of extensions of various end-effectors.
Figure 5B:
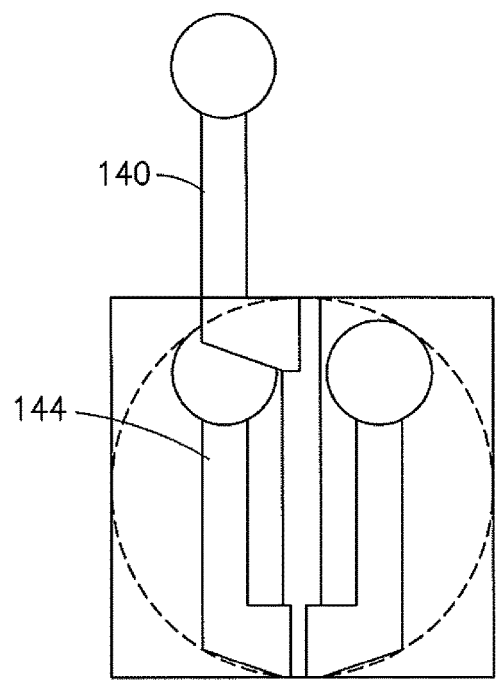
Figure 5C:
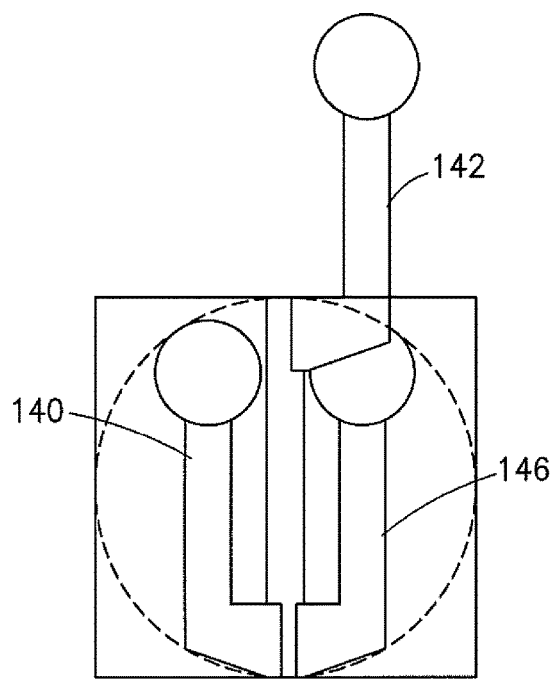
Figure 5D:
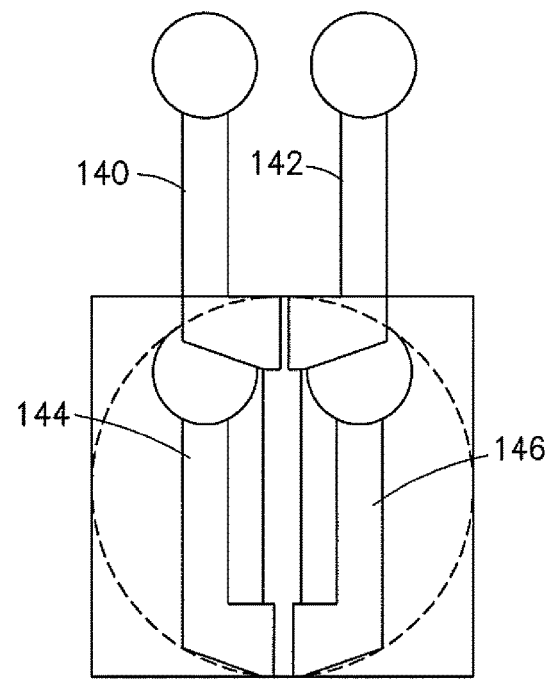
Figure 5E:
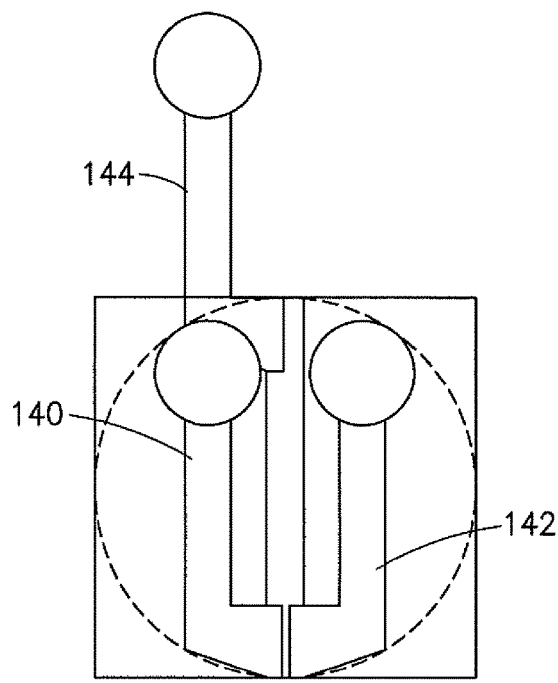
Figure 5F:
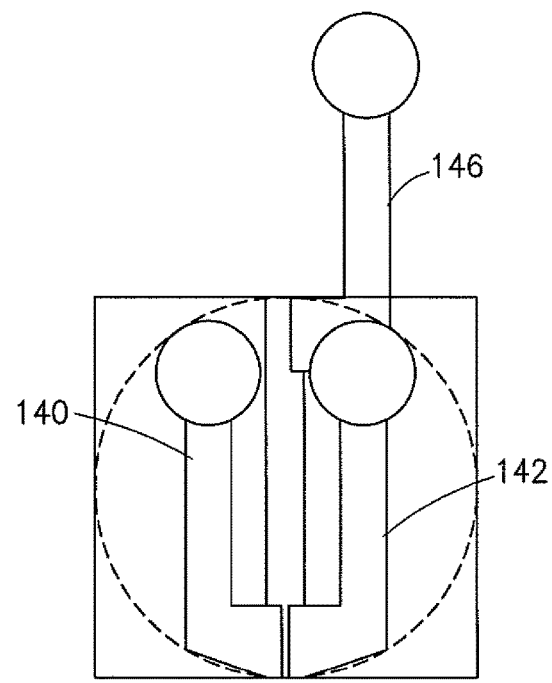
Figure 5G:
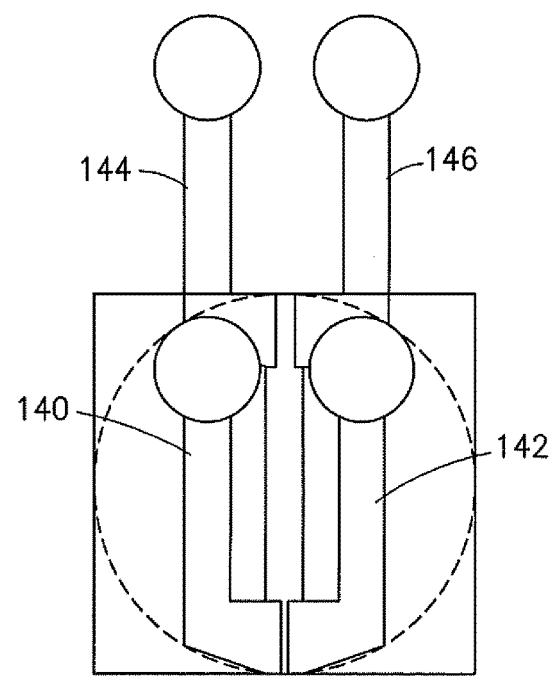
Figure 5H:
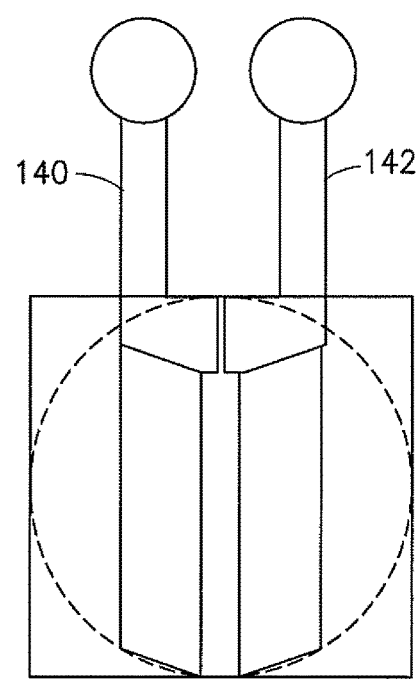

Referring to FIGS. 4A and 4B, an example of a bidirectional electromagnetic actuator arrangement that may be utilized as a vertical actuator in the magnetic support system is diagrammatically depicted. Although bidirectional electromagnetic actuator 260a is shown, other bidirectional electromagnetic actuators (for example, 260b and 260c) are similar. In this example, two unidirectional actuators may be combined into a single mechanical assembly with two windings 412 and a shared iron core 410 configured to interact with surfaces defining a C-shaped guide 250. Since the central section of the iron core 410 is shared by the two windings 412, this arrangement may provide a desirably smaller and lighter actuator package compared to two unidirectional actuators (the central section of the iron core 410 may be shared because the two windings 412 are not energized at the same time).

Referring back to FIG. 2B, power may be delivered to the traversing platform 210 from the frame 200 of the robot arm 120 utilizing a contactless linear power coupling 500. The linear power coupling 500 may operate, for example, on an inductive principle and, as illustrated in FIGS. 2A-2C, may feature one or more primary modules 510 attached to the frame 200 of the robot arm 120 and a corresponding and interacting secondary module integrated into the traversing platform 210. The frame 200 of the robot arm 120 may receive power from the drive unit 110 using a contactless rotary power coupling The rotary power coupling may operate, for example, on an inductive principle and may feature a primary module connected to the drive unit 110 and a secondary module attached to the frame 200 of the robot arm 120. As another example, the linear power coupling 500 and the rotary power coupling may utilize a capacitive principle of operation. Alternatively, the linear power coupling 500 and the rotary power coupling may utilize any suitable principle of operation.

Communication with the traversing platform 210, which may include communication between the traversing platform 210 and the frame 200 of the robot arm 120 and communication between the frame 200 of the robot arm 120 and the drive unit 110, may be facilitated in a contactless manner, for example, utilizing an inductive, capacitive, optical, or radio-frequency principle or a combination of any suitable physical principle.

The surfaces of the traversing platform 210 and the frame 200 of the robot arm 120 that face each other may be configured to facilitate heat transfer from the traversing platform 210 to the frame 200 of the robot arm 120. As an example, the traversing platform 210 and the frame 200 of the robot arm 120 may feature interleaving features, for example, fins, to increase the effective area available for heat transfer while allowing for traversing motion of the traversing platform with respect to the frame 200 of the robot arm 120. Furthermore, the effective surfaces may be treated to improve their thermal emissivity. For example, the components may be made of aluminum and the effective surfaces may be anodized.

In order to remove the heat from the frame 200 of the robot arm 120, a rotary thermal coupling may be utilized between the frame 200 of the robot arm 120 and the housing of the spindle assembly of the drive unit. An example rotary thermal coupling may comprise two portions, each featuring one or more substantially cylindrical surfaces aligned coaxially with the corresponding rotary joint and arranged so that a cylindrical surface on one portion of the thermal coupling faces an opposing cylindrical surface on the other portion of the thermal coupling. The opposing cylindrical surfaces may be configured to transfer heat via radiation across the gap between the opposing substantially cylindrical surfaces of the rotary thermal coupling. The radiation mechanism may be supplemented by convection/conduction through the environment between the opposing substantially cylindrical surfaces of the rotary thermal power coupling if residual gases are present in the vacuum environment.

In order to increase the effective area and minimize the volume occupied by the example rotary thermal coupling, an array of substantially cylindrical features may be provided on each of the two portions of the rotary thermal coupling, and the two arrays may be arranged in an interleaving manner.

Alternatively, the two portions of the rotary thermal coupling may provide opposing disk-shaped features configured for contactless heat transfer across the gap between them. As another alternative, any other suitable shapes of the effective features of the rotary thermal coupling, including but not limited to conical and spherical shapes, and their combination may be utilized.

Again, the effective surfaces of the rotary thermal coupling may be treated to improve their thermal emissivity. For example, the two portions of the rotary thermal coupling may be made of aluminum and the effective surfaces may be anodized.

The housing of the spindle assembly of the drive unit (spindle housing) may be passively or actively (liquid, forced-air) cooled. Alternatively, in particular if the drive unit features a lift mechanism, the surfaces of the spindle housing and the frame of the drive unit that face each other may be configured to facilitate heat transfer from the spindle housing to the frame of the drive unit. As an example, the spindle housing and the frame of the drive unit may feature interleaving features, for example, fins, to increase the effective area available for heat transfer while allowing for vertical motion of the spindle assembly with respect to the frame of the drive unit. Again, the effective surfaces may be treated to improve their thermal emissivity. For example, the components may be made of aluminum and the effective surfaces may be anodized.

Referring back to FIGS. 1A-20, a control system of the robot 100 according to the present invention may include the master control system 130, which may be complemented by various control modules responsible for control of one or more axes of the robot 100. The master control system 130 may coordinate the various control modules, if applicable, as well as the control system(s) of the linear actuation system(s) 220 of the traversing platform(s) 210 and the control system(s) of the magnetic support system(s) 248 of the traversing platform(s) 210. The master control system 130 may comprise one or more processors 20 and one or more memories 22 storing code or programs for controlling systems that operate the drive unit 110. The master control system 130 may also control one or more sensors for sensing positions of members of the drive unit 110, members of the robot arms, and/or substrates on the end effectors 140, 142, 144, 146, for example.

The operation of the robot of FIGS. 1A-1C is illustrated in FIG. 5. Diagram (a) shows all end-effectors retracted. Diagrams (b), (c), (e), and (f) show end-effectors 140, 142, 144, 146, respectively, extended. Diagram (d) shows end-effectors 140 and 142 extended simultaneously. Diagram (g) shows end-effectors 144 and 146 extended simultaneously. Diagram (h) shows all end-effectors, for example, end-effectors 140, 142, 144, 146, extended simultaneously.

Figure 6A:
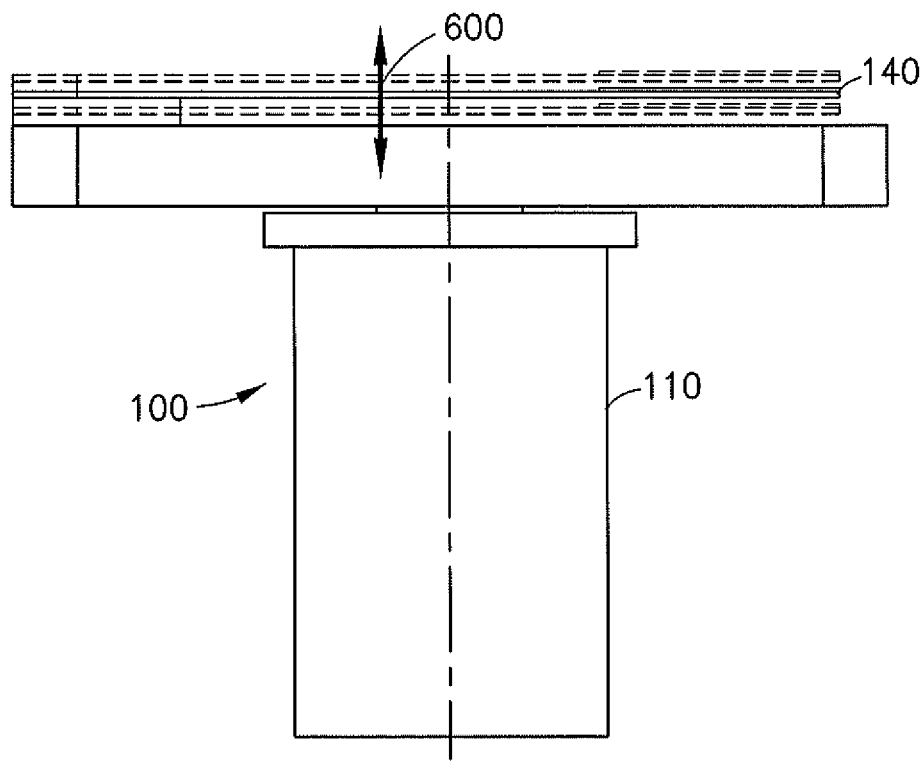
FIGS. 6A, 6B, 6C, 6D, and 6E are schematic representations of movements of various traversing platforms of the robot.
Figure 6B:
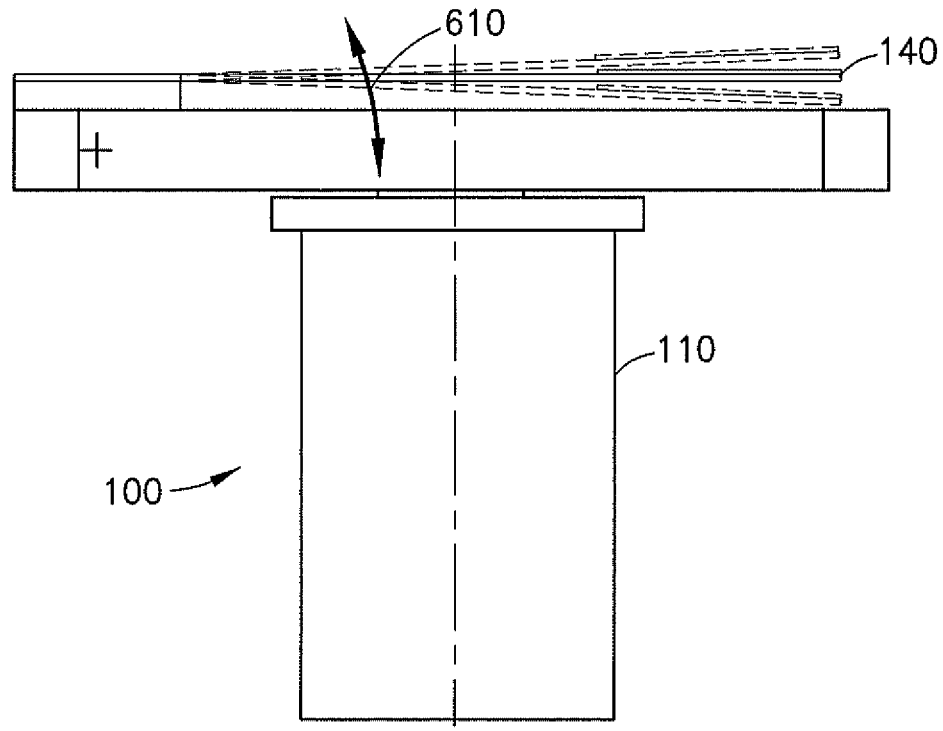
Figure 6C:
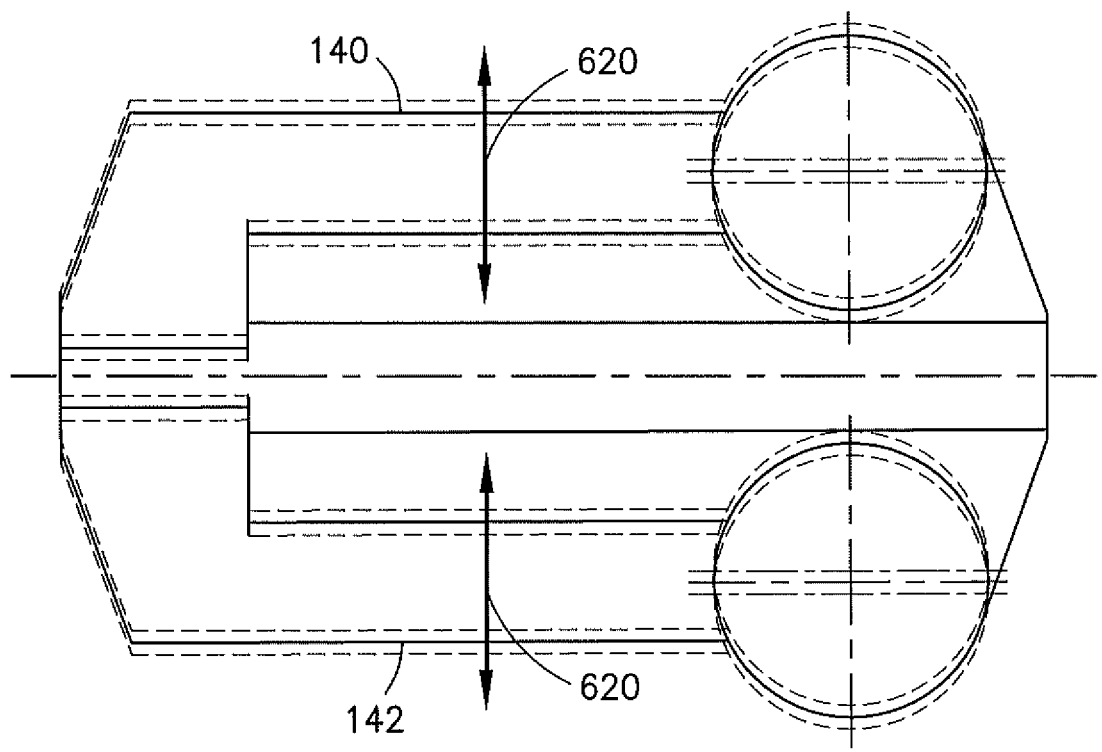
Figure 6D:
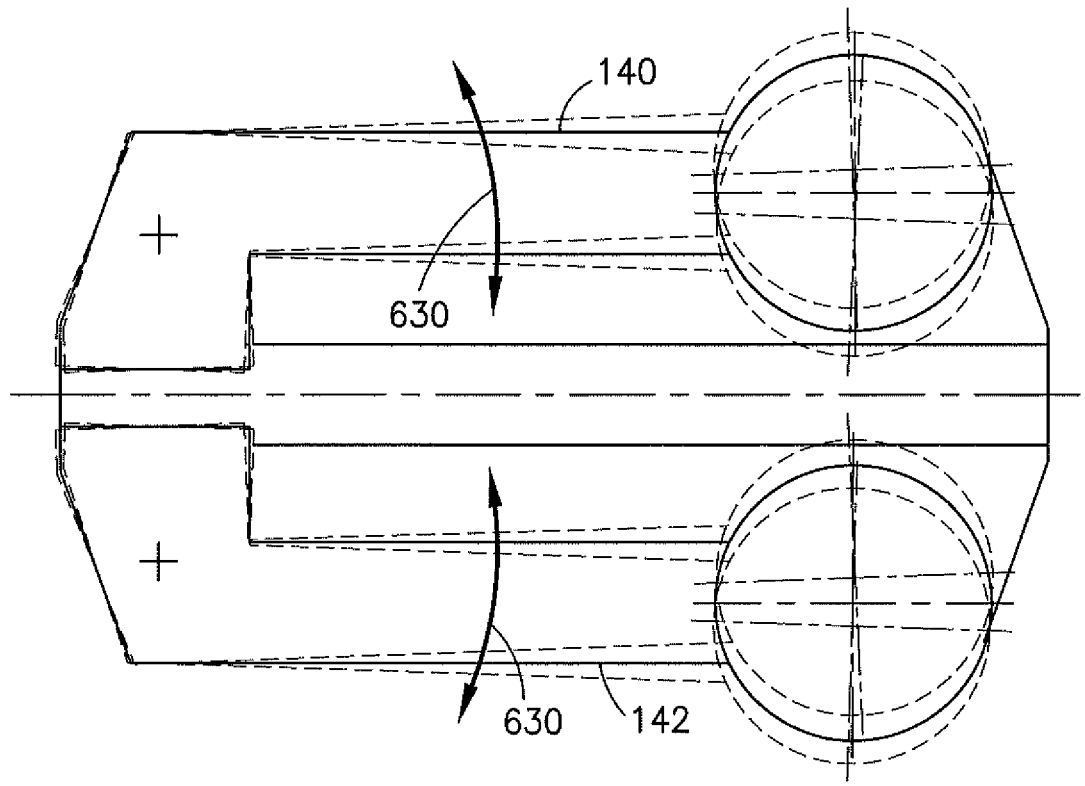
Figure 6E:
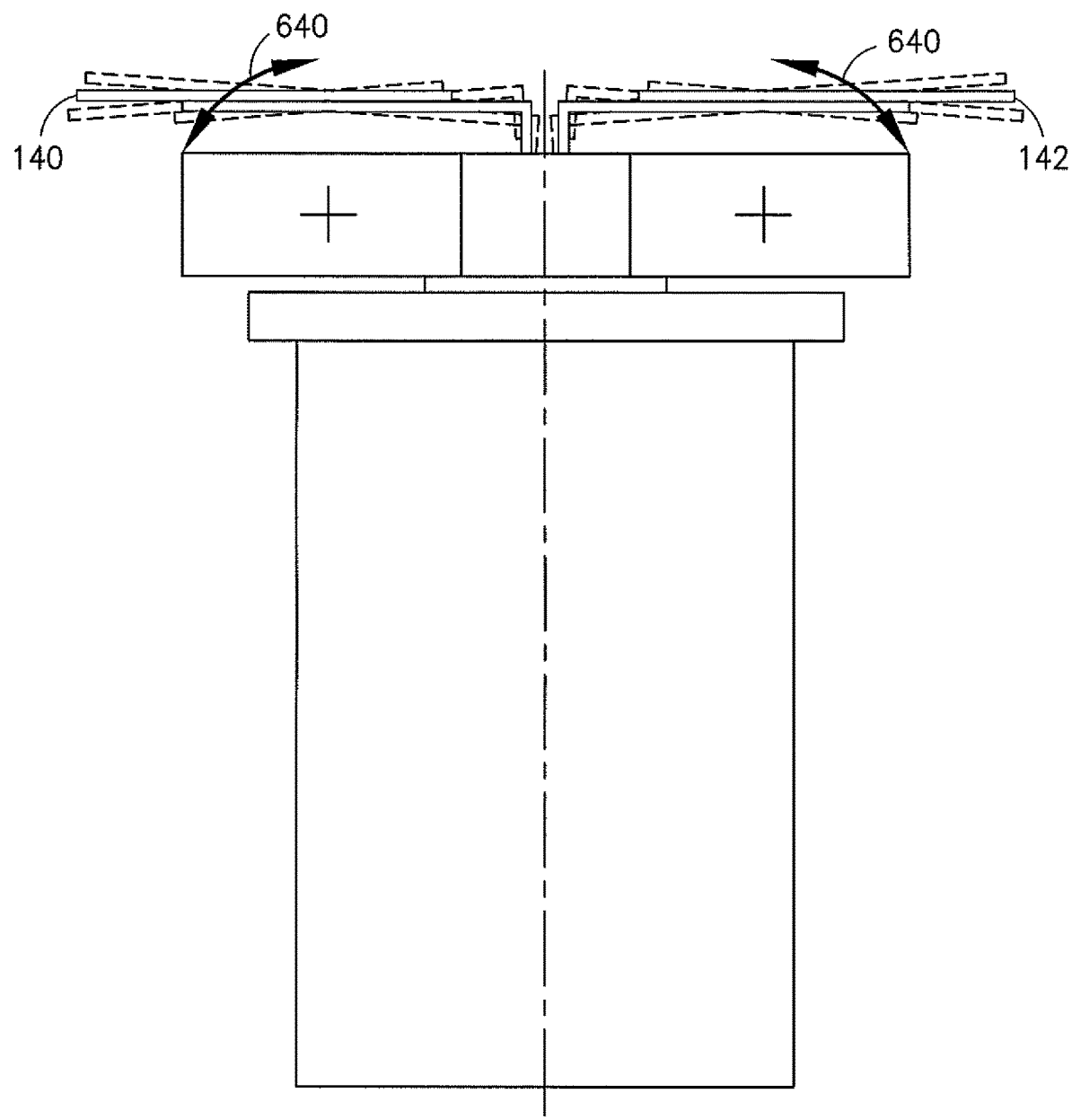
Figure 7A:
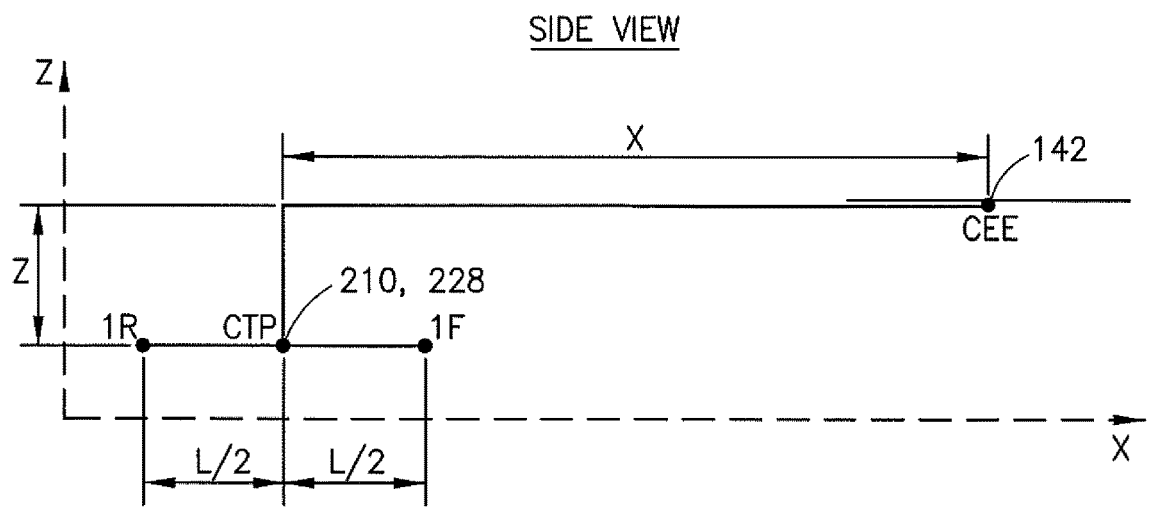
Figure 7B:
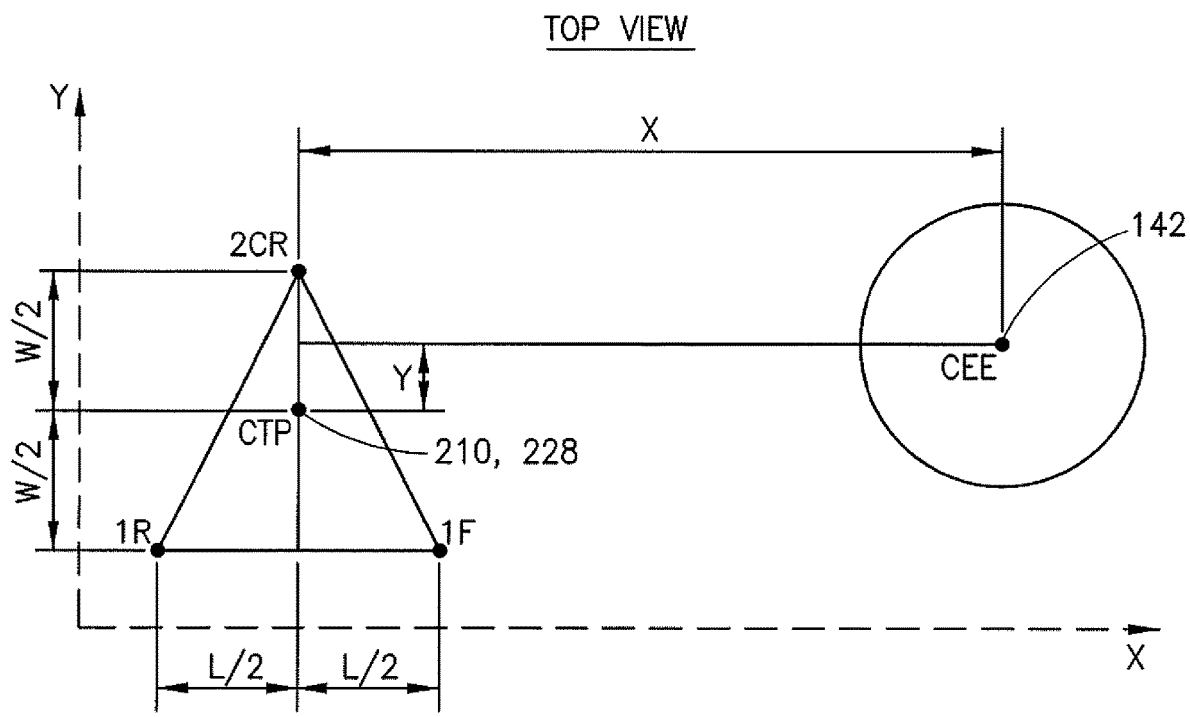

The magnetic support system 248 may be utilized to adjust the vertical position, lateral position, pitch angle, roll angle, and yaw angle of each of the traversing platforms (and, therefore, the vertical position, lateral position, pitch angle, roll angle, and yaw angle of the end-effector carried by the respective traversing platform) independently of the other traversing platforms, as illustrated in FIGS. 6A-6E (which show a robot 100 with one end-effector 140 for clarity of depiction). In FIG. 6A, a vertical position adjustment is depicted by arrow 600, which shows the end-effector 140 in a neutral position as well as in upper and lower positions in phantom; in FIG. 6B, a pitch angle adjustment is depicted by arrow 610; in FIG. 6C, a lateral position adjustment of end-effectors 140, 142 is depicted by arrows 620; in FIG. 6D, a yaw angle adjustment is depicted by arrows 630; and in FIG. 6E, a roll angle adjustment of end-effectors 140, 142 is depicted by arrows 640.

Referring further to FIGS. 7-10, the following nomenclature can be introduced to facilitate a more detailed description of the above capability:

CEE end-effector center
CTP traversing platform center
L effective length of traversing platform (m)
X longitudinal offset of end-effector center from traversing platform center (m)
Y lateral offset of end-effector center from traversing platform center (m)
Z vertical offset of end-effector center from traversing platform center (m)
W effective width of traversing platform (m)

$x_{EE}$ x-coordinate of end-effector center (m)
$x_{TP}$ x-coordinate of traversing platform center (m)
$z_{EE}$ z-coordinate of end-effector center (m)
$y_{1F}$ y-coordinate of front sensor of traversing platform (m)
$y_{1R}$ y-coordinate of rear sensor of traversing platform (m)
$y_{TP}$ y-coordinate of traversing platform center (m)
$y_{TP0}$ y-coordinate of traversing platform center in nominal position (m)
$z_{1F}$ z-coordinate of front sensor on first side of traversing platform (m)
$z_{1R}$ z-coordinate of rear sensor on first side of traversing platform (m)
$z_{2C}$ z-coordinate of central sensor on second side of traversing platform (m)
$z_{TP}$ z-coordinate of traversing platform center (m)
$z_{TP0}$ z-coordinate of traversing platform center in nominal position (m)
$D_{VR}$ vertical adjustment of vertical lift of robot drive unit (m)
$q_P$ pitch angle of traversing platform and end-effector (rad)
$q_R$ roll angle of traversing platform and end-effector (rad)
$q_Y$ yaw angle of traversing platform and end-effector (rad)

The x-, y-, and z-coordinates above are defined in a coordinate system connected rigidly to the frame 200 of the robot arm 120. As a result, the coordinate system may rotate with the drive shaft of the drive unit 110 and move vertically with the vertical lift mechanism of the drive unit 110.

For simplicity, as indicated in FIGS. 7-10, the position sensor 228 of the linear actuation system 220 is assumed to be located at the center of the traversing platform 210, and the sensors of the magnetic support system 248 and the position sensor 228 of the linear actuation system 220 are assumed to be located in the same plane on the traversing platform 210.

Using a pure translational motion of the traversing platform 210 with respect to the frame 200 of the robot arm 120, the vertical position of the end-effector 142 (or any other end-effector 140, 144, 146) may be adjusted by positioning the traversing platform as follows:

$$z_{1F} = z_{EE} - Z \tag{1}$$

$$z_{1R} = z_{EE} - Z \tag{2}$$

$$z_{2C} = z_{EE} - Z \tag{3}$$

Figure 8:
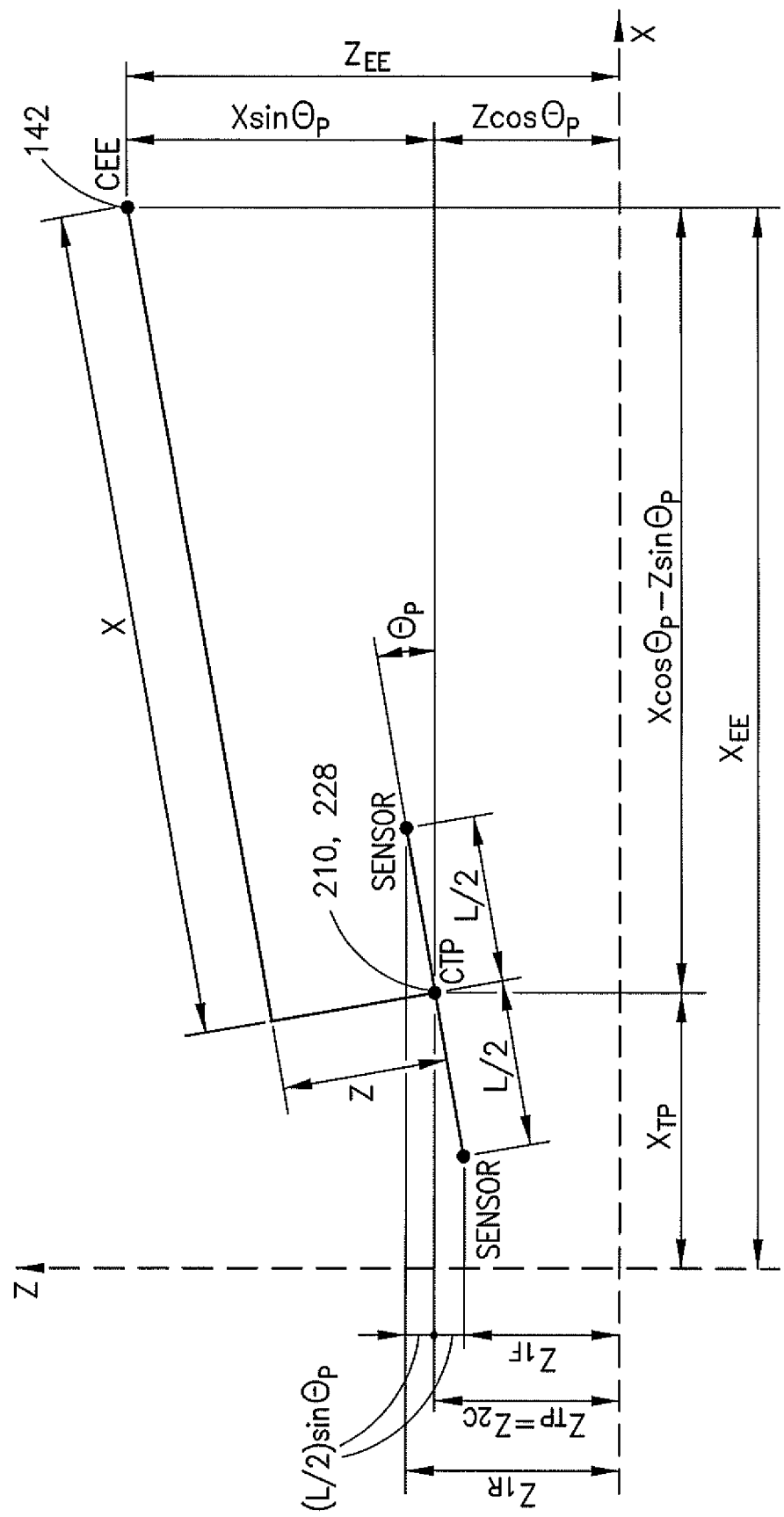

Referring to FIG. 8, the pitch angle of the traversing platform 210 may be adjusted by controlling its z-coordinates according to the following expressions:

$$z_{1F} = z_{TP0} + (L/2)\sin\theta_P \tag{4}$$

$$z_{1R} = z_{TP0} - (L/2)\sin\theta_P \tag{5}$$

$$z_{2C} = z_{TP0} \tag{6}$$

When the traversing platform 210 is repositioned from an initial position, such as its nominal position, to a new position according to Equations (4) to (6), it may rotate with respect to the center of the traversing platform 210 or, more accurately, around an axis going through the center of the traversing platform 210 and parallel to the y-axis of the coordinate system.

The pitch angle of the traversing platform 210 may be conveniently used to adjust the vertical position of the end-effector 142 beyond the range achievable through a pure translational motion. In order to adjust the vertical position of the end-effector 142 by changing the pitch angle of the traversing platform 210, the following pitch angle can be used in Equations (4) to (6):

$$\theta_P = \operatorname{acos}[(z_{EE} - T_{TP0})/\operatorname{sqrt}(X^2 + Z^2)] + \operatorname{atan}(X/Z) \tag{7}$$

On the other hand, if so desired, the pitch angle of the end-effector 142 may be adjusted independently of (for example, without any effect on) its vertical position by positioning the traversing platform 210 according to the following expressions:

$$z_{1F} = z_{EE} - (X - L/2)\sin\theta_P - Z\cos\theta_P \tag{8}$$

$$z_{1R} = z_{EE}(X + L/2)\sin\theta_P - Z\cos\theta_P \tag{9}$$

$$z_{2C} = z_{EE} - X\sin\theta_P - Z\cos\theta_P \tag{10}$$

When the traversing platform 210 is repositioned from an initial position, such as its nominal position, to a new position according to Equations (8) to (10), the traversing platform 210 and the end-effector 142 may rotate with respect to the end-effector center or, more accurately, around an axis going through the end-effector center and parallel to the y-axis of the coordinate system.

For large pitch angle adjustments, the desired position of the traversing platform 210 calculated according to Equations (8) to (10) may be out of range of the magnetic support system 248. This may occur due to the effect of the longitudinal offset of the end-effector center from the traversing platform center. In such situations, the vertical lift mechanism of the robot drive unit may be conveniently utilized to keep the traversing platform 210 within the range of the magnetic support system 248. The position of the traversing platform 210 (expressed in a coordinate system connected rigidly to the frame 200 of the robot arm 120, as defined above) and the adjustment of the vertical position of the vertical lift mechanism of the drive unit 110 can be determined using the following expressions:

$$z_{1F} = z_{EE} + (L12)\sin\theta_P - Z\cos\theta_P \tag{11}$$

$$z_{1R} = z_{EE} - (L/2)\sin\theta_P - Z\cos\theta_P \tag{12}$$

$$z_{2C} = z_{EE} - Z\cos\theta_P \tag{13}$$

$$\Delta_{VR} = -X\sin\theta_P \tag{14}$$

In practice, the adjustment of the vertical position of the vertical lift mechanism of the drive unit 110 may compensate for factors common to multiple end-effectors of the robot 100, for example, structural deflection associated with the drive unit 110, and positioning of the traversing platforms 210 with respect to the frame 200 of the robot arm 120 may be used for adjustments specific to individual end-effectors, for example, misalignment of an end-effector with respect to a particular workstation.

In order to maintain the desired position of the end-effector in the x-axis direction regardless of the pitch angle, the traversing platform 210 may be positioned (using the linear actuation system 220) as follows:

$$x_{TP} = x_{EE} - X\cos\theta_P + Z\sin\theta_P \tag{15}$$

Figure 9:
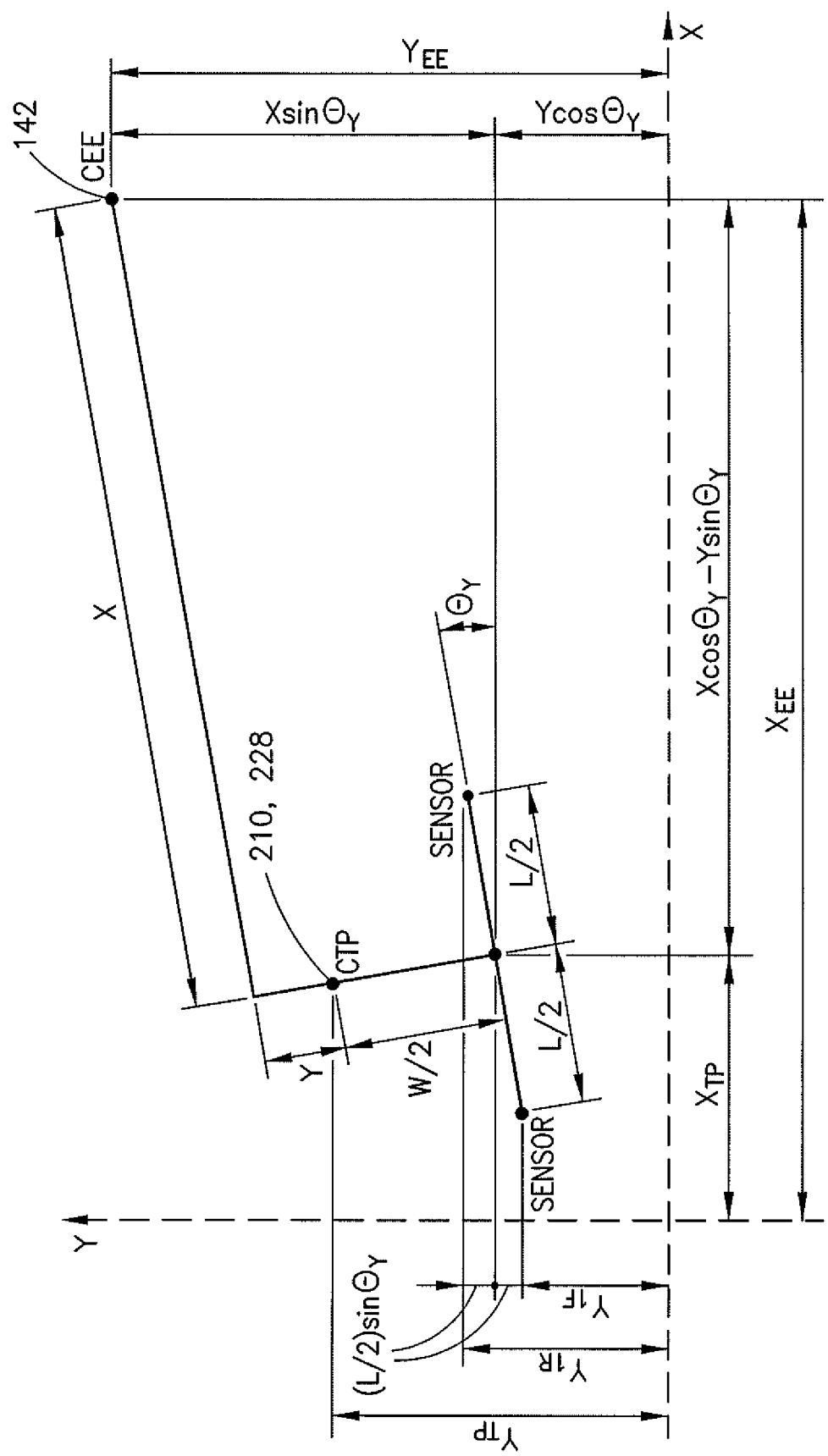

Similarly, referring to FIG. 9 now, using a pure translational motion, the lateral position of the end-effector may be adjusted by positioning the traversing platform 210 as follows:

$$y_{1F} = y_{EE} - (W/2 + Y) \tag{16}$$

$$y_{1R} = y_{EE} - (W/2 + Y) \tag{17}$$

The yaw angle of the traversing platform 210 may be adjusted by controlling its y-coordinates according to the following expressions:

$$y_{1F} = y_{TP0} - (W/2)\cos\theta_Y + (L/2)\sin\theta_Y \quad (18)$$

$$y_{1R} = y_{TP0} - (W/2)\cos\theta_Y - (L/2)\sin\theta_Y \quad (19)$$

When the traversing platform 210 is repositioned from an initial position, such as its nominal position, to a new position according to Equations (18) and (19), the traversing platform 210 may rotate with respect to the traversing platform center or, more accurately, around an axis going through the traversing platform center and parallel to the z-axis of the coordinate system.

The yaw angle of the traversing platform 210 may be conveniently used to adjust the lateral position of the end-effector beyond the range achievable through a pure translational motion. In order to adjust the lateral position of the end-effector by changing the yaw angle of the traversing platform 210, the following yaw angle can be used in Equations (18) and (19):

$$\theta_Y = a\cos\{(y_{EE} - y_{TP0})/\text{sqrt}\,[X^2 + (W/2 + Y)^2]\} + \text{atan}\,[X/(W/2 + Y)] \quad (20)$$

On the other hand, if so desired, the yaw angle of the end-effector may be adjusted independently of (for example, without any effect on) its lateral position by positioning the traversing platform 210 according to the following expressions:

$$y_{1F} = y_{EE} - (X - L/2)\sin\theta_Y - (W/2 + Y)\cos\theta_Y \quad (21)$$

$$y_{1R} = y_{EE} - (X + L/2)\sin\theta_Y - (W/2 + Y)\cos\theta_Y \quad (22)$$

When the traversing platform 210 is repositioned from an initial position, such as its nominal position, to a new position according to Equations (21) and (22), the traversing platform 210 and the end-effector may rotate with respect to the end-effector center or, more accurately, around an axis going through the end-effector center and parallel to the z-axis of the coordinate system.

In order to maintain the desired position of the end-effector in the x-axis direction regardless of the yaw angle, the traversing platform 210 may be positioned (using the linear actuation system 220) as follows:

$$x_{TP} = x_{EE} - X\cos\theta_Y + Y\sin\theta_Y \quad (23)$$

Figure 10:
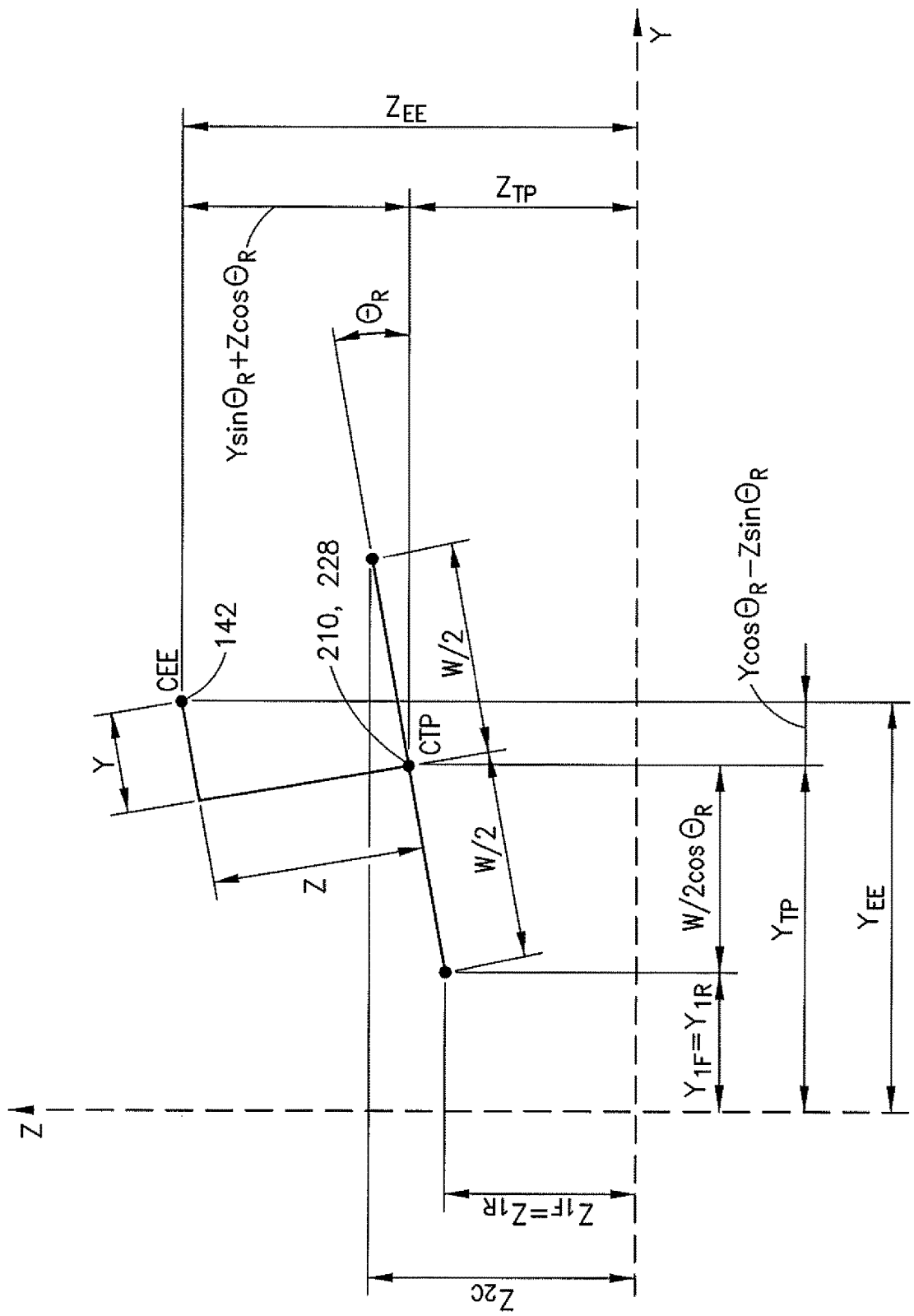

Finally, referring to FIG. 10, the roll angle of the traversing platform 210 and the end-effector may be adjusted by controlling the z-coordinates of the traversing platform 210 according to the following expressions:

$$z_{1F} = z_{TF0} - (L/2)\sin\theta_R \quad (24)$$

$$z_{1R} = z_{TF0} - (L/2)\sin\theta_R \quad (25)$$

$$z_{2C} = z_{TF0} + (L/2)\sin\theta_R \quad (26)$$

When the traversing platform 210 is repositioned from an initial position, such as its nominal position, to a new position according to Equations (24) to (26), it may rotate with respect to the traversing platform center or, more accurately, around an axis going through the traversing platform center and parallel to the x-axis of the coordinate system.

The adjustment of the roll angle according to Equations (24) to (26) above may change the vertical and lateral position of the end-effector. In order to adjust the roll angle independently of (for example, without any effect on) the vertical and lateral position of the end-effector, the traversing platform 210 may be positioned according to the following expressions:

$$y_{1F} = y_{EE} - (Y + W/2)\cos\theta_R + Z\sin\theta_R \quad (27)$$

$$y_{1R} = y_{EE} - (Y + W/2)\cos\theta_R + Z\sin\theta_R \quad (28)$$

$$z_{1F} = z_{EE} - (Y + W/2)\sin\theta_R - Z\cos\theta_R \quad (29)$$

$$z_{1R} = z_{EE} - (Y + W/2)\sin\theta_R - Z\cos\theta_R \quad (30)$$

$$z_{2C} = z_{EE} - (X - W/2)\sin\theta_R - Z\cos\theta_R \quad (31)$$

When the traversing platform 210 is repositioned from an initial position, such as its nominal position, to a new position according to Equations (29) to (31), the traversing platform 210 and the end-effector may rotate with respect to the end-effector center or, more accurately, around an axis going through the end-effector center and parallel to the x-axis of the coordinate system.

The ability to adjust the vertical position, lateral position, pitch angle, roll angle, and yaw angle of each of the traversing platforms 210 (and, therefore, the vertical position, lateral position, pitch angle, roll angle, and yaw angle of the end-effector carried by the traversing platform 210) may be conveniently utilized, for example, for the following functionalities and their combinations: (a) compensation for misalignment of a payload on an end-effector when the payload is being delivered to a workstation, (b) compensation for structural deflection of the robot 100, for example, the drive unit 110, the frame 200 of the robot arm 120 or the end-effector and its supporting structure, (c) active leveling of an end-effector, for example, keeping the end-effector horizontal, and (d) active alignment of an end-effector, for example, to a workstation.

It should be noted that the adjustments may take place when the motion axes of the robot 100, such as the rotary and vertical lift axes associated with the drive unit 110 or the linear motion axes associated with the robot arm 120 are stationary, or during motion of the robot 100 and, if desired, in coordination with one or more motion axes of the robot 100, for example, during a rotational move, a vertical move and/or a linear extend/retract move.

In the particular example embodiment described above, the robot 100 features four end-effectors A, B, C, D. They are configured as two pairs of side-by-side end-effectors, for example, the upper pair and lower pair, and the two pairs are arranged in a stacked configuration. Alternatively, the robot 100 may feature a single end-effector, two or more stacked end-effectors, two or more side-by-side end-effectors or any suitable combination of stacked and side-by-side end-effector arrangements.

In another example embodiment, the left and right end-effectors may be connected to the same traversing platform 210. As an example, the upper end-effectors A and B may be connected to one traversing platform 210 and the lower end-effectors C and D may be connected to another traversing platform.

In another example embodiment, the robot arm 120 may be configured so that the left end-effectors (for example, end-effectors A and C) and right end-effectors (for example, end-effectors B and D) may translate (move) in the lateral direction (left and right) with respect to each other.

In another example embodiment, the frame 200 of the robot arm 120 may comprise two portions, which may be configured to rotate, for example, within a limited range, with respect to each other. As an example, one portion of the frame 200 may carry the left end-effectors (for example, end-effectors 140 and 144), the other portion of the frame may carry the right end-effectors (for example, end-effectors 142 and 146). As another example, one portion of the frame 200 may carry the upper end-effectors (for example, end-effectors 140 and 142), the other portion may carry the lower end-effectors (for example, end-effectors 144 and 146).

It should also be noted that the drive unit 110 may include more than one spindle assembly and more than one vertical lift mechanism. For example, one spindle assembly with a dedicated vertical lift mechanism may be utilized for each of the portions of the frame 200 of the robot arm 120 described above.

Although the description of the example embodiment illustrated in FIGS. 1A-2E suggests that the stationary portion of the linear actuator 222 may be passive (for example, the magnet track 240) and the moving portion of the linear actuator 222 may be active (for example, a forcer with coils 238), the stationary portion of the linear actuator 222 may be active (for example, a track of coils 238) and the moving portion of the linear actuator 222 may be passive (for example, a magnet plate).

Similarly, although the description of the example embodiment illustrated in FIGS. 1A-2E suggests that the vertical and horizontal actuators and sensors of the magnetic support system may be attached to the traversing platform 210, the vertical and horizontal actuators and sensors may be attached to the frame 200 of the robot arm 120 and distributed along the desired range of motion of the traversing platform 210.

Alternatively, any suitable combination of locations of the active and passive portions of the linear actuator 222, vertical and horizontal actuators, and vertical and horizontal sensors may be used.

Features as described herein may be used to provide a robot capable of picking and placing a payload from/to workstations in clean and vacuum-environment applications while eliminating contamination associated with mechanical bearings of conventional robot mechanisms. Features as described herein may be used to provide the capability of (a) carrying multiple payloads simultaneously, (b) picking, placing, and exchanging multiple payloads simultaneously and (c) picking, placing, and exchanging individual payloads independently. The above capabilities increase production yield by reducing contamination of the payload and improve productivity by processing multiple payloads concurrently while also providing the flexibility of processing individual payloads sequentially, for example, due to workstation maintenance.

In one example, an apparatus comprises a drive unit; and an arm assembly connected to the drive unit, where the arm assembly comprises a traversing platform having an end-effector configured to carry a payload located thereon; a linear actuation system configured to drive the traversing platform in a linear direction; and a magnetic support system comprising at least one guide attached to a frame of the arm assembly, a plurality of vertical actuators attached to the traversing platform, and a plurality of horizontal actuators attached to the traversing platform, the plurality of vertical actuators being configured, with the at least one guide, to move the traversing platform in a vertical direction relative to the linear direction, and the plurality of horizontal actuators being configured, with the at least one guide, to move the traversing platform in a horizontal direction relative to the linear direction.

The linear actuation system may comprise at least one linear actuator, at least one position sensor, and at least one position control system. The plurality of vertical actuators may comprise three bidirectional electromagnetic actuators, each being attached to the traversing platform and configured to produce electromagnetic forces between the traversing platform and the at least one guide. A first of the three bidirectional electromagnetic actuators may be attached proximate a side of the traversing platform, a second of the three bidirectional electromagnetic actuators may be attached proximate a front of the traversing platform, and a third of the three bidirectional electromagnetic actuators may be attached proximate a rear of the traversing platform. The plurality of horizontal actuators may comprise three unidirectional electromagnetic actuators, each being attached to the traversing platform and configured to produce electromagnetic forces between the traversing platform and the at least one guide. A first of the three unidirectional electromagnetic actuators may be attached proximate a side of the traversing platform, a second of the three unidirectional electromagnetic actuators may be attached proximate a front of the traversing platform, and a third of the three unidirectional electromagnetic actuators may be attached proximate a rear of the traversing platform. The apparatus may further comprise a plurality of vertical sensors and a plurality of horizontal sensors, each of the vertical sensors being configured to measure a position of the traversing platform as the traversing platform moves in the vertical direction, and each of the horizontal sensors being configured to measure a position of the traversing platform as the traversing platform moves in the horizontal direction. The plurality of vertical sensors may comprise three vertical sensors and the plurality of vertical actuators may comprise three vertical actuators, each of the three vertical sensors positioned proximate a corresponding one of the plurality of vertical actuators. The plurality of horizontal sensors may comprise two horizontal sensors, a first of the two horizontal sensors positioned proximate a first one of the horizontal actuators and a second of the two horizontal sensors positioned proximate a second one of the horizontal actuators. The vertical sensors and the horizontal sensors may be optical sensors, magnetic sensors, inductive sensors, or capacitive sensors. The apparatus may further comprise a control system coupled to one or more of the drive unit or the arm assembly, the control system comprising at least one processor and at least one non-transitory memory including computer program code.

In another example, an apparatus comprises at least one processor; and at least one non-transitory memory including computer program code, the at least one memory and the computer program code configured to, with the at least one processor, cause the apparatus at least to: actuate three vertical actuators to control first, second, and third degrees of freedom related to a vertical position of a traversing platform of a robot; actuate three horizontal actuators to control fourth and fifth degrees of freedom related to a horizontal position of the traversing platform of the robot; and actuate a linear actuator to control a sixth degree of freedom related to a linear movement of the traversing platform of the robot.

Causing the apparatus to actuate the three vertical actuators to control the first, second, and third degrees of freedom may comprise controlling a z-axis coordinate, a pitch angle, and a roll angle of the traversing platform. The pitch angle of the traversing platform may be changed to adjust the vertical position of the traversing platform. The pitch angle of the traversing platform may be changed independently of the vertical position of the traversing platform. Causing the apparatus to actuate the three horizontal actuators to control the fourth and fifth degrees of freedom may comprise controlling a y-axis coordinate and a yaw angle of the traversing platform. The yaw angle of the traversing platform may be changed to adjust the horizontal position of the traversing platform. The yaw angle of the traversing platform may be changed independently of the horizontal position of the traversing platform. Causing the apparatus to actuate the linear actuator to control the sixth degree of freedom may comprise controlling an x-axis coordinate of the traversing platform. The roll angle of the traversing platform may be changed to adjust a position of the traversing platform along a z-axis. The roll angle of the traversing platform may be changed independently of the vertical position of the traversing platform and the horizontal position of the traversing platform.

In another example, a method of adjusting a position of a traversing platform of a robot comprises actuating three vertical actuators to control first, second, and third degrees of freedom related to a vertical position of the traversing platform; actuating three horizontal actuators to control fourth and fifth degrees of freedom related to a horizontal position of the traversing platform; and actuating a linear actuator to control a sixth degree of freedom related to a linear movement of the traversing platform.

Actuating the three vertical actuators to control the first, second, and third degrees of freedom may comprise controlling a z-axis coordinate, a pitch angle, and a roll angle of the traversing platform. Controlling the pitch angle of the traversing platform may adjust the vertical position of the traversing platform. Controlling the pitch angle of the traversing platform may not change the vertical position of the traversing platform. Actuating the three horizontal actuators to control the fourth and fifth degrees of freedom may comprise controlling a y-axis coordinate and a yaw angle of the traversing platform. Controlling the yaw angle of the traversing platform may adjust the horizontal position of the traversing platform. Controlling the yaw angle of the traversing platform may not change the horizontal position of the traversing platform. Actuating the linear actuator to control the sixth degree of freedom may comprise controlling an x-axis coordinate of the traversing platform.

In another example, an apparatus comprises a drive unit; and an arm assembly connected to the drive unit. The arm assembly comprises a first traversing platform having a first end-effector configured to carry a first payload located thereon, a first linear actuation system configured to drive the first traversing platform in a first direction, and a first magnetic support system comprising at least one first guide attached to a frame of the arm assembly, a first plurality of vertical actuators attached to the first traversing platform, and a first plurality of horizontal actuators attached to the first traversing platform, the first plurality of vertical actuators being configured, with the at least one first guide, to move the first traversing platform in a vertical direction, and the first plurality of horizontal actuators being configured, with the at least one first guide, to move the first traversing platform in a horizontal direction; and at least one second traversing platform having a second end-effector configured to carry a second payload located thereon, a second linear actuation system configured to drive the second traversing platform in a first direction, and a second magnetic support system comprising at least one second guide attached to the frame of the arm assembly, a second plurality of vertical actuators attached to the second traversing platform, and a second plurality of horizontal actuators attached to the second traversing platform, the second plurality of vertical actuators being configured, with the at least one second guide, to move the second traversing platform in a vertical direction, and the second plurality of horizontal actuators being configured, with the at least one second guide, to move the second traversing platform in a horizontal direction.

The first end-effector and the second end-effector may be arranged side-by-side. The first end-effector and the second end-effector may be arranged in a stacked configuration. The first plurality of vertical actuators may comprise three bidirectional electromagnetic actuators, each being attached to the first traversing platform and configured to produce electromagnetic forces between the first traversing platform and the at least one first guide; and the second plurality of vertical actuators may comprise three bidirectional electromagnetic actuators, each being attached to the second traversing platform and configured to produce electromagnetic forces between the second traversing platform and the at least second first guide. The first plurality of horizontal actuators may comprise three unidirectional electromagnetic actuators, each being attached to the first traversing platform and configured to produce electromagnetic forces between the first traversing platform and the at least one first guide, and the second plurality of horizontal actuators may comprise three unidirectional electromagnetic actuators, each being attached to the second traversing platform and configured to produce electromagnetic forces between the second traversing platform and the at least one second guide. The apparatus may further comprise a first plurality of vertical sensors and a first plurality of horizontal sensors, each of the first vertical sensors being configured to measure a position of the first traversing platform in a vertical direction, and each of the first horizontal sensors being configured to measure a position of the first traversing platform in a horizontal direction, and a second plurality of vertical sensors and a second plurality of horizontal sensors, each of the second vertical sensors being configured to measure a position of the second traversing platform in a vertical direction, and each of the second horizontal sensors being configured to measure a position of the second traversing platform in a horizontal direction. The apparatus may further comprise a control system coupled to one or more of the drive unit or the arm assembly, the control system comprising at least one processor and at least one non-transitory memory including computer program code.

It should be understood that the foregoing description is only illustrative. Various alternatives and modifications can be devised by those skilled in the art. For example, features from different embodiments described above could be selectively combined into a new embodiment. Accordingly, the description is intended to embrace all such alternatives, modifications, and variances which fall within the scope of the appended claims.

What is claimed is:

1. An apparatus, comprising:
    a drive unit; and
    an arm assembly connected to the drive unit, where the arm assembly comprises:
        a traversing platform having an end-effector configured to carry a payload located thereon;
        a linear actuation system configured to drive the traversing platform in a linear direction; and
        a magnetic support system comprising at least one guide attached to a frame of the arm assembly, a plurality of vertical actuators attached to the traversing platform, and a plurality of horizontal actuators attached to the traversing platform, the plurality of vertical actuators being configured, with the at least one guide, to move the traversing platform in a vertical direction relative to the linear direction and to rotate the traversing platform about at least one of a first axis extending through a center of the traversing platform and horizontal to the linear direction and a second axis extending through the center of the traversing platform and in the linear direction, and the plurality of horizontal actuators spaced in the linear direction and being configured, with the at least one guide, to move the traversing platform in a horizontal direction relative to the linear direction and to rotate the traversing platform about a third axis extending through the center of the traversing platform and orthogonal to the traversing platform.

2. The apparatus of claim 1, wherein the linear actuation system comprises at least one linear actuator, at least one position sensor, and at least one position control system.

3. The apparatus of claim 1, wherein the plurality of vertical actuators comprises three bidirectional electromagnetic actuators, each being attached to the traversing platform and configured to produce electromagnetic forces between the traversing platform and the at least one guide.

4. The apparatus of claim 3, wherein a first of the three bidirectional electromagnetic actuators is attached on a top along a first edge of the traversing platform, a second of the three bidirectional electromagnetic actuators is attached on the top along a second edge of the traversing platform, and a third of the three bidirectional electromagnetic actuators is attached on the top along a third edge of the traversing platform.

5. The apparatus of claim 1, wherein the plurality of horizontal actuators comprises three unidirectional electromagnetic actuators, each being attached to the traversing platform and configured to produce electromagnetic forces between the traversing platform and the at least one guide.

6. The apparatus of claim 5, wherein a first of the three unidirectional electromagnetic actuators is attached on a top along a first edge of the traversing platform, a second of the three unidirectional electromagnetic actuators is attached on the top along a second edge of the traversing platform, and a third of the three unidirectional electromagnetic actuators is attached on the top along a third edge of the traversing platform.

7. The apparatus of claim 1, further comprising a plurality of vertical sensors and a plurality of horizontal sensors, each of the vertical sensors being configured to measure a position of the traversing platform as the traversing platform moves in the vertical direction, and each of the horizontal sensors being configured to measure a position of the traversing platform as the traversing platform moves in the horizontal direction.

8. The apparatus of claim 7, wherein the plurality of vertical sensors comprises three vertical sensors and the plurality of vertical actuators comprises three vertical actuators, each of the three vertical sensors being spaced from a corresponding one of the plurality of vertical actuators.

9. The apparatus of claim 7, wherein the plurality of horizontal sensors comprises two horizontal sensors, a first of the two horizontal sensors being spaced from a first one of the horizontal actuators and a second of the two horizontal sensors spaced from a second one of the horizontal actuators.

10. The apparatus of claim 7, wherein the vertical sensors and the horizontal sensors are optical sensors, magnetic sensors, inductive sensors, or capacitive sensors.

11. The apparatus of claim 1, further comprising a control system coupled to one or more of the drive unit or the arm assembly, the control system comprising at least one processor and at least one non-transitory memory including computer program code.

12. An apparatus, comprising:
a drive unit; and
an arm assembly connected to the drive unit, where the arm assembly comprises:
a first traversing platform having a first end-effector configured to carry a first payload located thereon, a first linear actuation system configured to drive the first traversing platform in a first direction, and a first magnetic support system comprising at least one first guide attached to a frame of the arm assembly, a first plurality of vertical actuators attached to the first traversing platform, and a first plurality of horizontal actuators attached to the first traversing platform, the first plurality of vertical actuators being configured, with the at least one first guide, to move the first traversing platform in a vertical direction relative to the first direction and to rotate the first traversing platform about at least one of a first axis extending through a center of the first traversing platform and horizontal to the first direction and a second axis extending through the center of the first traversing platform and in the first direction, and the first plurality of horizontal actuators spaced in the first direction and being configured, with the at least one first guide, to move the first traversing platform in a horizontal direction relative to the first direction and to rotate the first traversing platform about a third axis extending through the center of the first traversing platform and orthogonal to the first traversing platform; and
at least one second traversing platform having a second end-effector configured to carry a second payload located thereon, a second linear actuation system configured to drive the second traversing platform in a first direction, and a second magnetic support system comprising at least one second guide attached to the frame of the arm assembly, a second plurality of vertical actuators attached to the second traversing platform, and a second plurality of horizontal actuators attached to the second traversing platform, the second plurality of vertical actuators being configured, with the at least one second guide, to move the second traversing platform in a vertical direction relative to the first direction and to rotate the second traversing platform about at least one of a first axis extending through a center of the at least one second traversing platform and horizontal to the first direction and a second axis extending through the center of the at least one second traversing platform and in the first direction, and the second plurality of horizontal actuators spaced in the first direction and being configured, with the at least one second guide, to move the second traversing platform in a horizontal direction relative to the first direction and to rotate the at least one second traversing platform about a third axis extending through the center of the at least one second traversing platform and orthogonal to the at least one second traversing platform.

13. The apparatus of claim 12, wherein the first end-effector and the second end-effector are arranged side-by-side.

14. The apparatus of claim 12, wherein the first end-effector and the second end-effector are arranged in a stacked configuration.

15. The apparatus of claim 12, wherein the first plurality of vertical actuators comprises three bidirectional electromagnetic actuators, each being attached to the first traversing platform and configured to produce electromagnetic forces between the first traversing platform and the at least one first guide; and wherein the second plurality of vertical actuators comprises three bidirectional electromagnetic actuators, each being attached to the second traversing platform and configured to produce electromagnetic forces between the second traversing platform and the at least second first guide.

16. The apparatus of claim 15, wherein the first plurality of horizontal actuators comprises three unidirectional electromagnetic actuators, each being attached to the first traversing platform and configured to produce electromagnetic forces between the first traversing platform and the at least one first guide, and wherein the second plurality of horizontal actuators comprises three unidirectional electromagnetic actuators, each being attached to the second traversing platform and configured to produce electromagnetic forces between the second traversing platform and the at least one second guide.

17. The apparatus of claim 12, further comprising a first plurality of vertical sensors and a first plurality of horizontal sensors, each of the first vertical sensors being configured to measure a position of the first traversing platform in a vertical direction, and each of the first horizontal sensors being configured to measure a position of the first traversing platform in a horizontal direction, and a second plurality of vertical sensors and a second plurality of horizontal sensors, each of the second vertical sensors being configured to measure a position of the second traversing platform in a vertical direction, and each of the second horizontal sensors being configured to measure a position of the second traversing platform in a horizontal direction.

18. The apparatus of claim 12, further comprising a control system coupled to one or more of the drive unit or the arm assembly, the control system comprising at least one processor and at least one non-transitory memory including computer program code.

* * * * *